(12) United States Patent
Kwak et al.

(10) Patent No.: US 9,489,913 B2
(45) Date of Patent: Nov. 8, 2016

(54) FLEXIBLE DISPLAY APPARATUS AND CONTROL METHOD THEREOF

(71) Applicant: SAMSUNG ELECTRONICS CO., LTD., Suwon-si (KR)

(72) Inventors: Ji-yeon Kwak, Seoul (KR); Sang-keun Jung, Suwon-si (KR); Hyun-jin Kim, Seoul (KR); Jung-joo Sohn, Seoul (KR); Geun-ho Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/046,296

(22) Filed: Oct. 4, 2013

(65) Prior Publication Data

US 2014/0098075 A1    Apr. 10, 2014

(30) Foreign Application Priority Data

Oct. 4, 2012   (KR) .................. 10-2012-0110321

(51) Int. Cl.
*G09G 5/00*    (2006.01)
*G06F 3/0487*    (2013.01)
*G06F 1/16*    (2006.01)
(Continued)

(52) U.S. Cl.
CPC .............. *G09G 5/00* (2013.01); *G06F 1/1652* (2013.01); *G06F 3/016* (2013.01); *G06F 3/0414* (2013.01); *G06F 3/0418* (2013.01); *G06F 3/0487* (2013.01); *G09G 3/2003* (2013.01); *G09G 3/2007* (2013.01); *G09G 2300/023* (2013.01); *G09G 2300/0426* (2013.01); *G09G 2354/00* (2013.01); *G09G 2380/02* (2013.01)

(58) Field of Classification Search
CPC ...... G06F 1/1652; G06F 3/016; G06F 3/038; G06F 3/048
USPC .................................................. 345/156, 173
See application file for complete search history.

(56) References Cited

U.S. PATENT DOCUMENTS 8,610,663 B2 * 12/2013 Kim ....................... G06F 3/033
345/156
8,666,455 B2 * 3/2014 Song ................... H04M 1/0268
455/566

(Continued)

FOREIGN PATENT DOCUMENTS

EP    2 202 624 A2    6/2010
EP    2 463 848 A1    6/2012

(Continued)

OTHER PUBLICATIONS

International Search Report (PCT/ISA/210), dated Jan. 28, 2014, issued by the International Searching Authority in counterpart International Patent Application No. PCT/KR2013/008893.

(Continued)

*Primary Examiner* — Ricardo L Osorio
(74) *Attorney, Agent, or Firm* — Sughrue Mion, PLLC

(57) ABSTRACT

A flexible display apparatus is provided. The flexible display apparatus includes: a display configured to display an object on a screen; an actuator configured to provide shape deformation to the display; and a controller configured to determine deformation information for reconfiguring and displaying the object, control the actuator to provide the shape deformation according to the determined deformation information, and control the display to reconfigure the displayed object and display the reconfigured object.

19 Claims, 35 Drawing Sheets

(51) Int. Cl.
*G06F 3/01* (2006.01)
*G06F 3/041* (2006.01)
*G09G 3/20* (2006.01)

(56) References Cited

U.S. PATENT DOCUMENTS

| | | | | |
|---|---|---|---|---|
| 8,922,523 | B2* | 12/2014 | Lynch | G06F 3/0414 |
| | | | | 345/174 |
| 9,007,315 | B2* | 4/2015 | Kim | G06F 3/0414 |
| | | | | 178/18.05 |
| 9,117,384 | B2* | 8/2015 | Phillips | G06F 3/012 |
| 9,152,225 | B2* | 10/2015 | Park | G06F 3/01 |
| 2004/0008191 | A1 | 1/2004 | Poupyrev et al. | |
| 2007/0139391 | A1 | 6/2007 | Bischoff | |
| 2009/0066663 | A1 | 3/2009 | Chang et al. | |
| 2009/0182501 | A1 | 7/2009 | Fyke et al. | |
| 2009/0315834 | A1 | 12/2009 | Nurmi et al. | |
| 2010/0056223 | A1* | 3/2010 | Choi | G06F 1/1601 |
| | | | | 455/566 |
| 2010/0141605 | A1* | 6/2010 | Kang | G06F 1/1626 |
| | | | | 345/174 |
| 2010/0164888 | A1 | 7/2010 | Okumura et al. | |
| 2010/0225578 | A1* | 9/2010 | Ko | 345/156 |
| 2010/0277439 | A1 | 11/2010 | Charlier et al. | |
| 2010/0302190 | A1* | 12/2010 | Yeh | 345/173 |
| 2011/0102462 | A1 | 5/2011 | Birnbaum | |
| 2011/0193771 | A1 | 8/2011 | Chronqvist | |
| 2011/0227855 | A1* | 9/2011 | Kim | G02F 1/13306 |
| | | | | 345/173 |
| 2011/0234502 | A1 | 9/2011 | Yun et al. | |
| 2012/0105333 | A1 | 5/2012 | Maschmeyer et al. | |
| 2012/0133621 | A1* | 5/2012 | Kim | H04M 1/0206 |
| | | | | 345/204 |
| 2012/0139834 | A1 | 6/2012 | Han et al. | |
| 2013/0093660 | A1* | 4/2013 | Hirsch et al. | 345/156 |
| 2013/0265221 | A1* | 10/2013 | Lee et al. | 345/156 |
| 2013/0321260 | A1* | 12/2013 | Joo | G09G 5/005 |
| | | | | 345/156 |
| 2014/0029017 | A1* | 1/2014 | Lee | G01B 11/24 |
| | | | | 356/601 |
| 2014/0078047 | A1* | 3/2014 | Seo | G06F 3/0487 |
| | | | | 345/156 |

FOREIGN PATENT DOCUMENTS

| | | |
|---|---|---|
| WO | 03/050754 A1 | 6/2003 |
| WO | 2008/150600 A1 | 12/2008 |
| WO | 2012/129247 A2 | 9/2012 |

OTHER PUBLICATIONS

Written Opinion (PCT/ISA/237), dated Jan. 28, 2014, issued by the International Searching Authority in counterpart International Patent Application No. PCT/KR2013/008893.
Communication, dated Mar. 6, 2014, issued by the European Patent Office in counterpart European Patent Application No. 13187407.5.
Lahey, Byron, et al., "PaperPhone: Understanding the Use of Bend Gestures in Mobile Devices with Flexible Electronic Paper Displays," CHI 2011 Session: Flexible Grips & Gestures, May 7-12, 2011, pp. 1303-1312.
Communication dated Jul. 23, 2014 issued by the European Patent Office in counterpart European Application No. 13187407.5.

* cited by examiner

FIG. 3
(a)
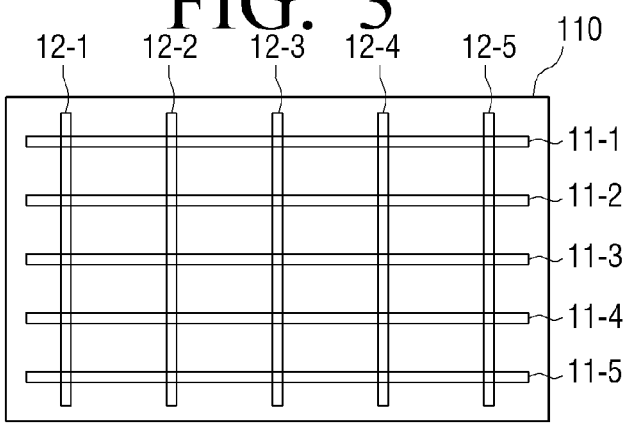
(b)
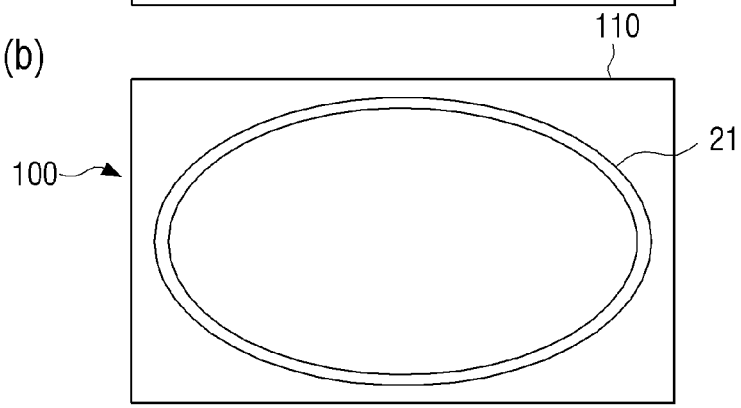
(c)
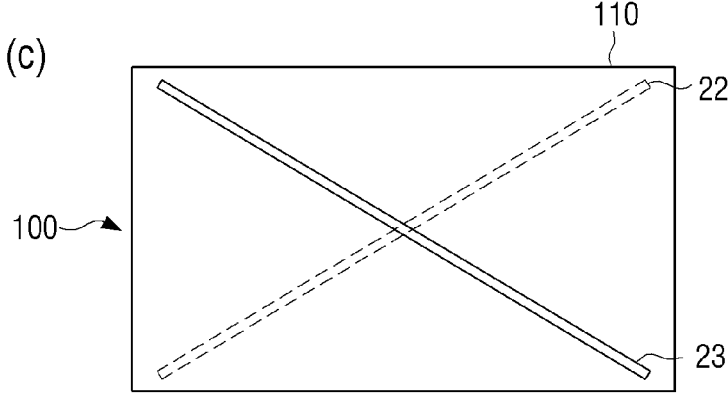
(d)
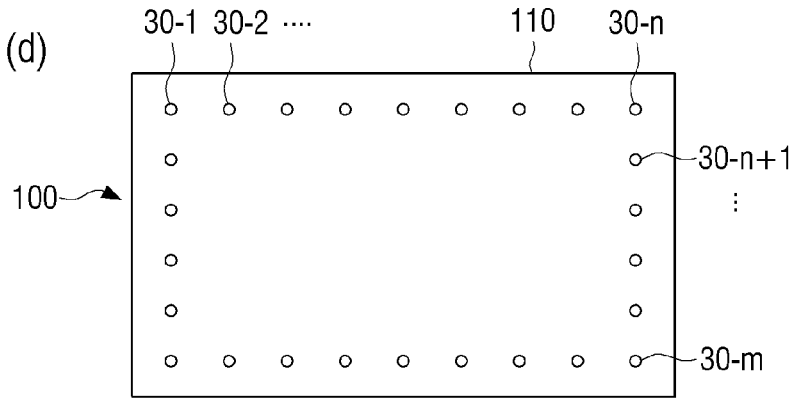

FIG. 4
(a)
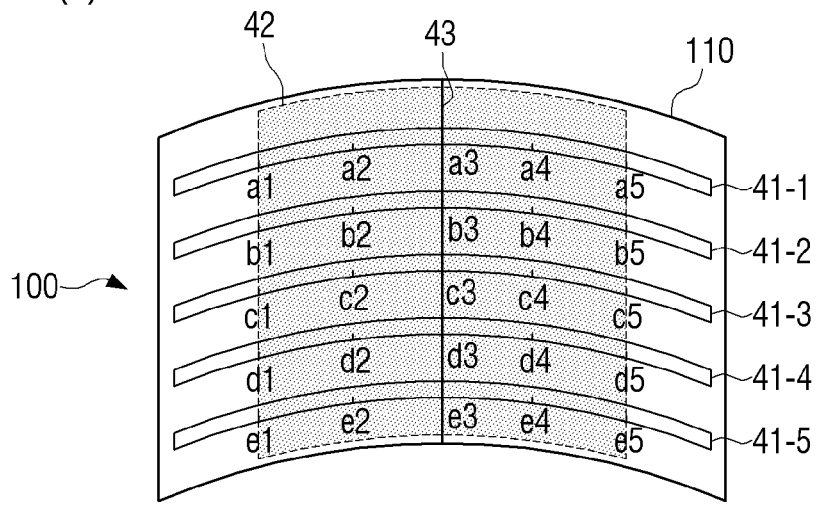
(b)
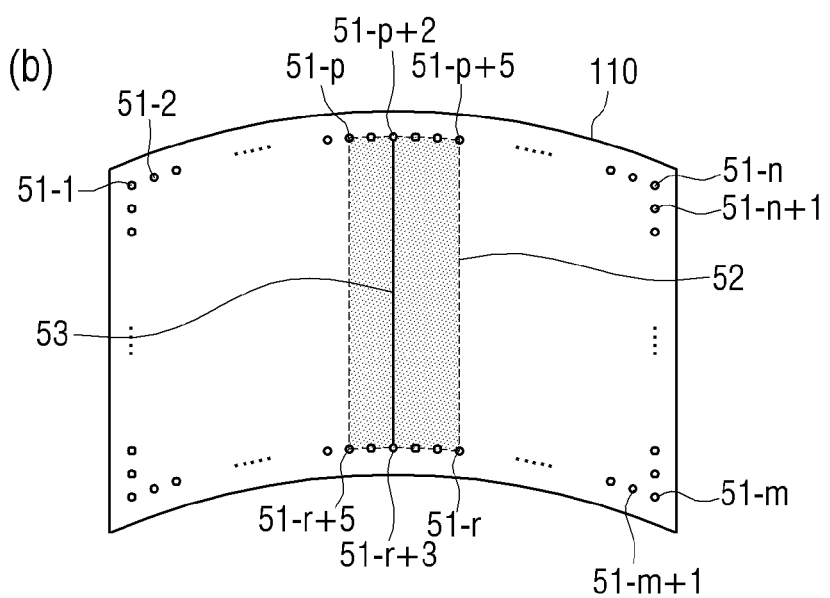

FIG. 6
(a)
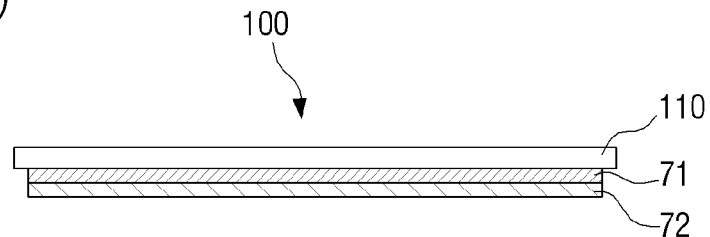
(b)
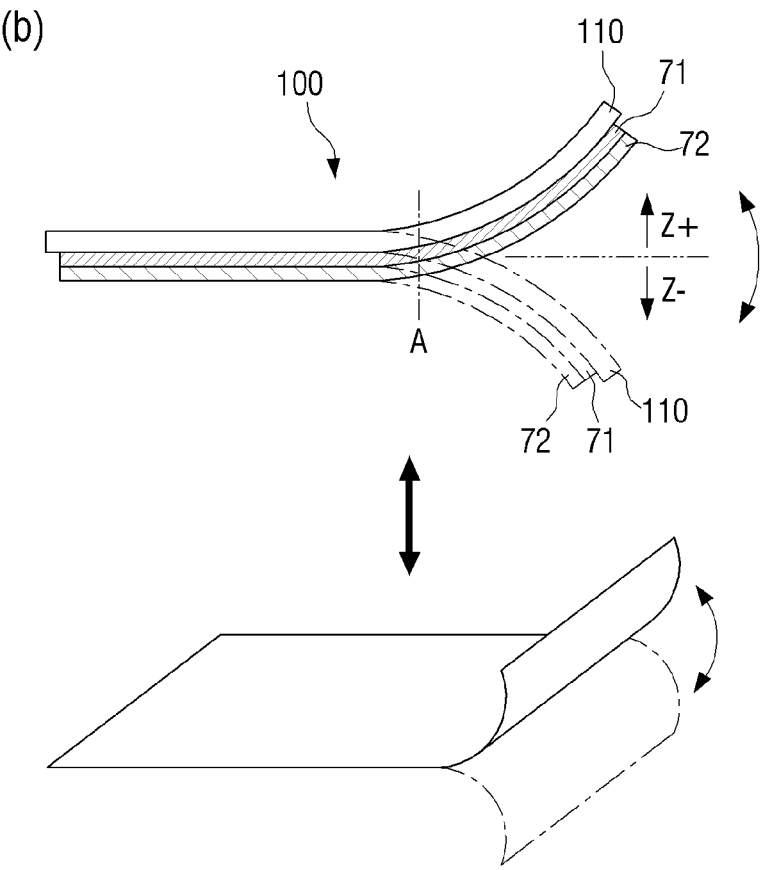
(c)
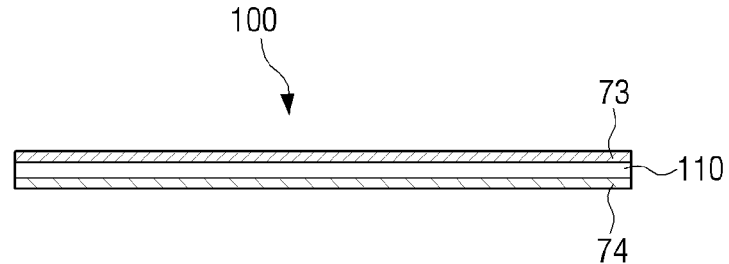

FIG. 8
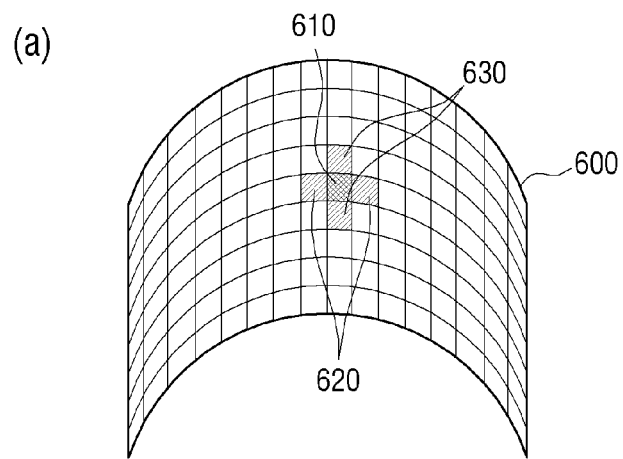
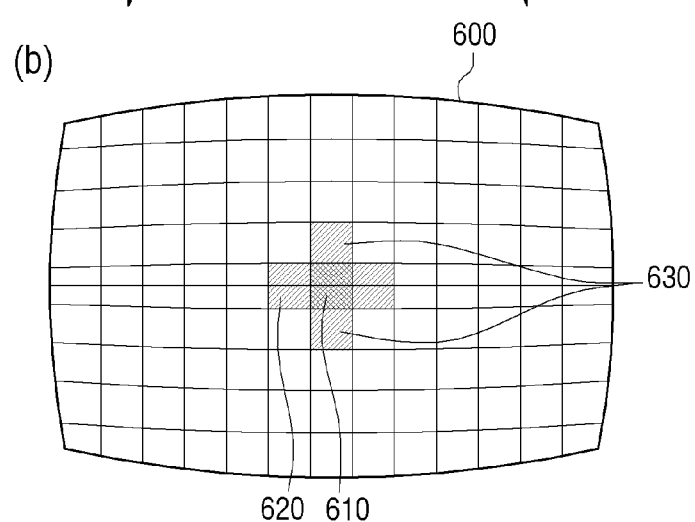
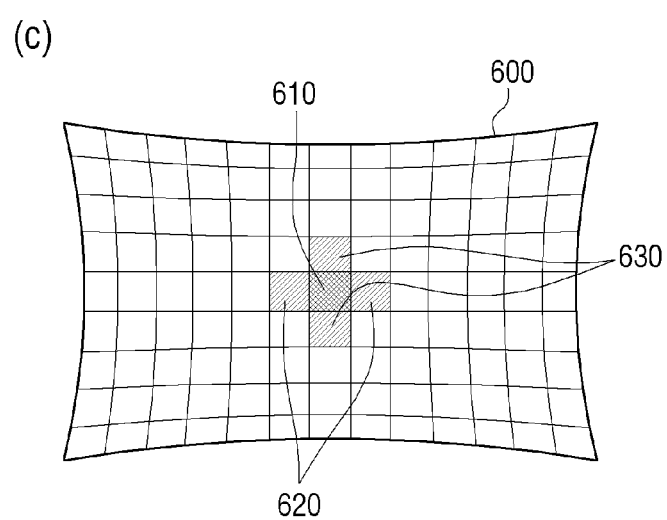

FIG. 9
(a)
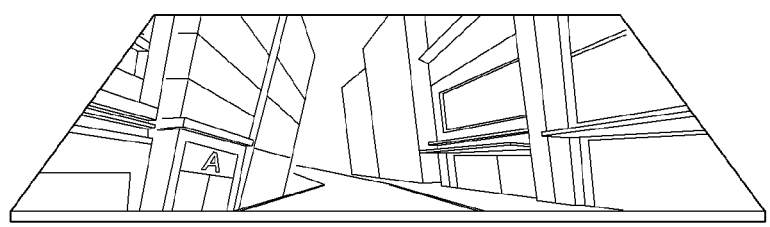
(b)
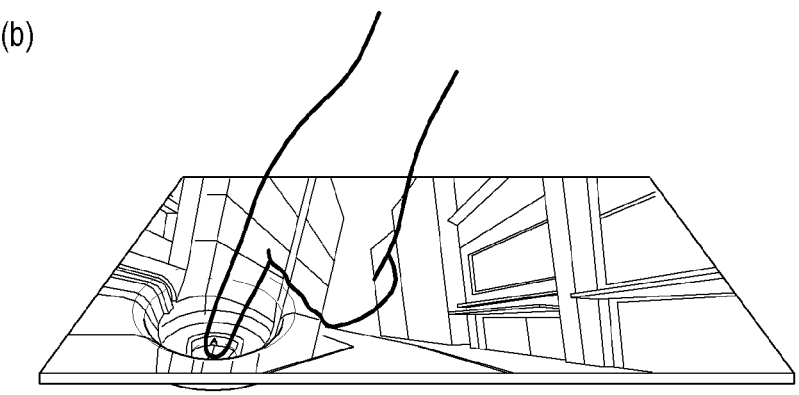
(c)
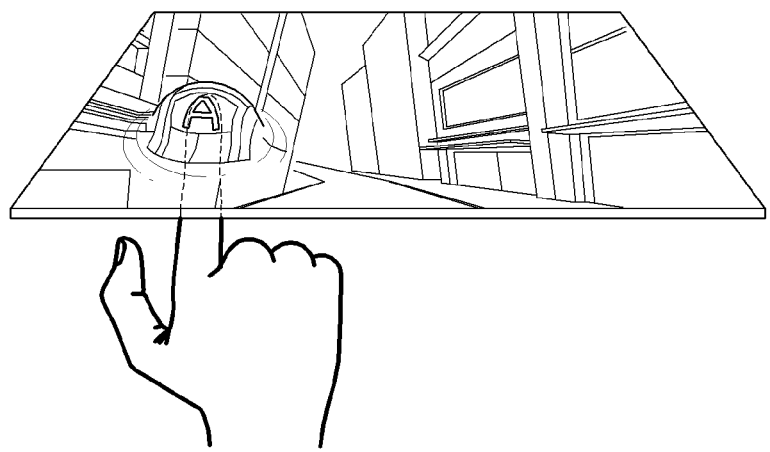

FIG. 10
(a)
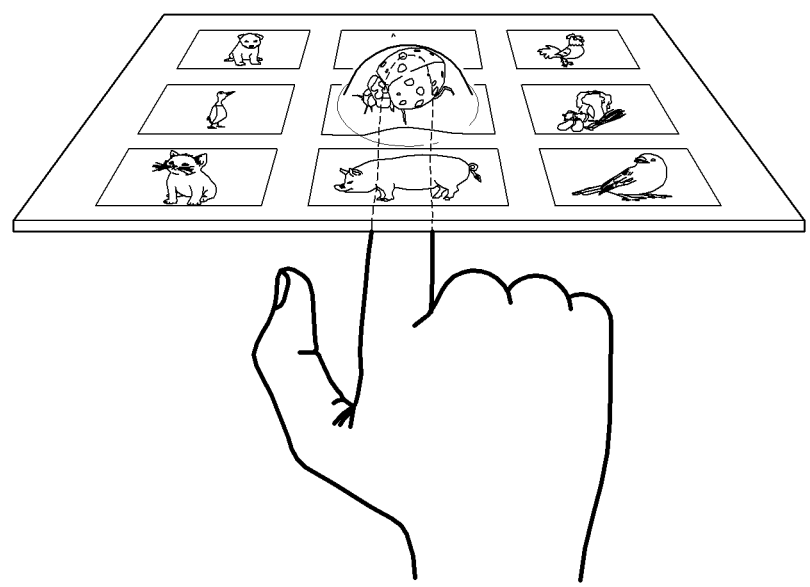
(b)
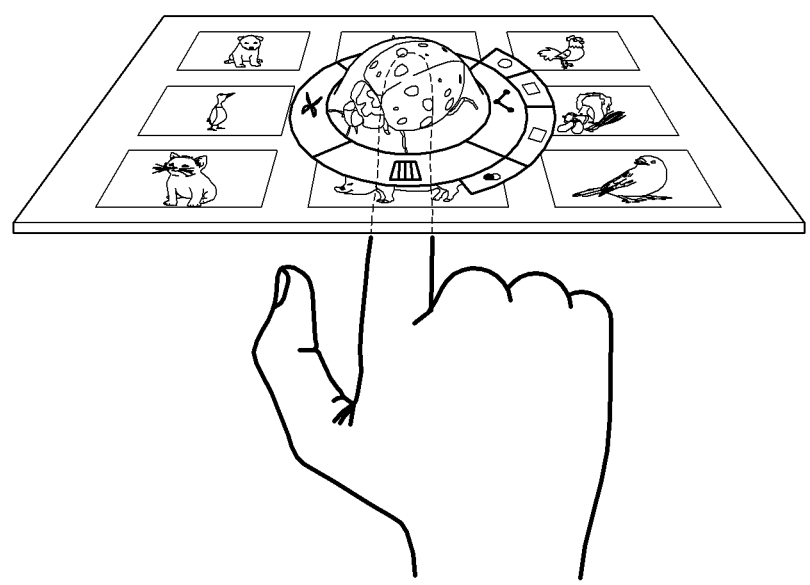

FIG. 11
(a)
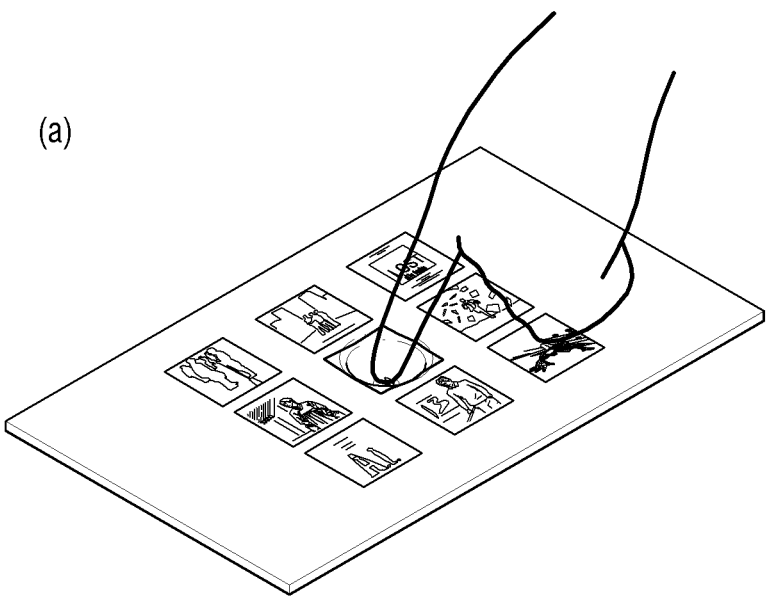
(b)
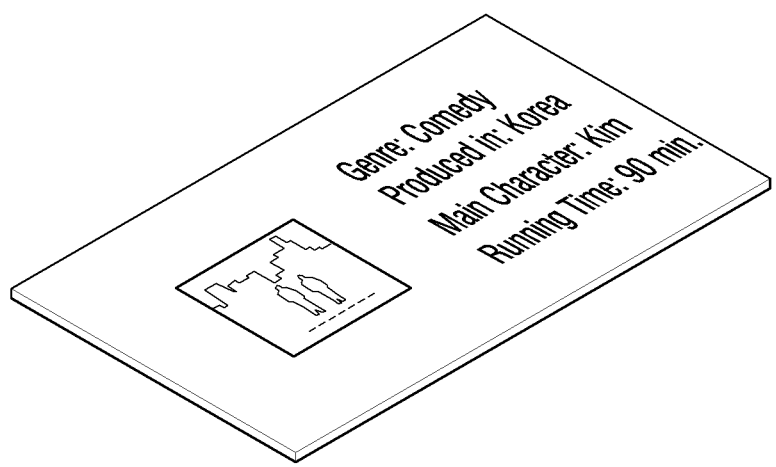

FIG. 12
(a)
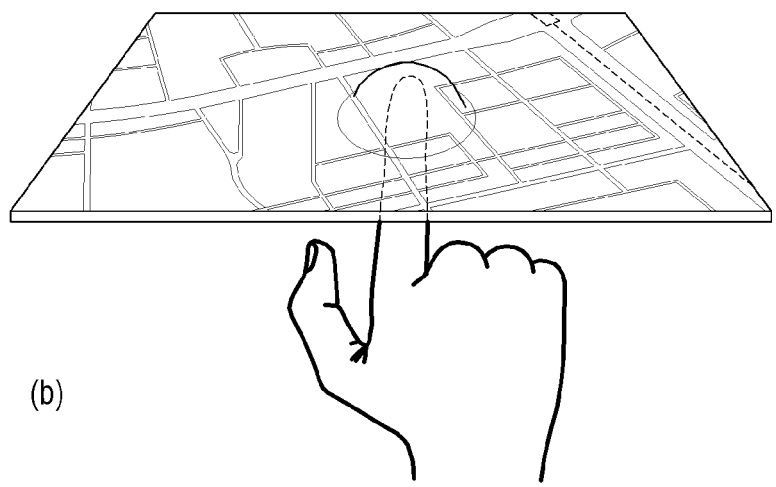
(b)
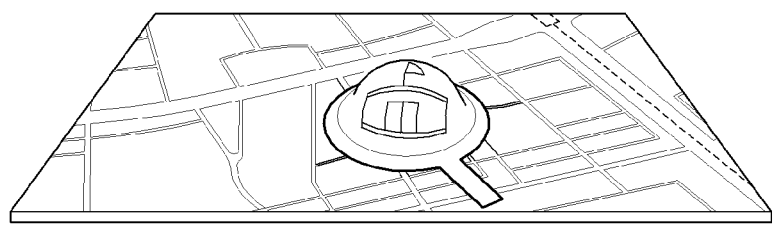

FIG. 16
(a) 100
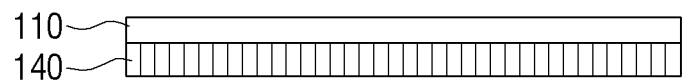
(b)
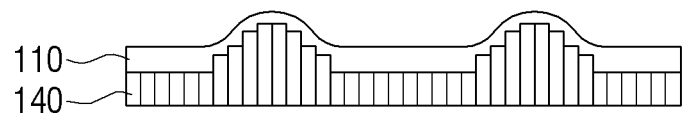

FIG. 17
(a)
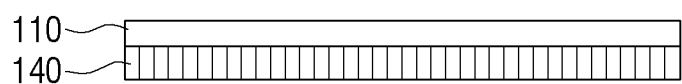
(b)
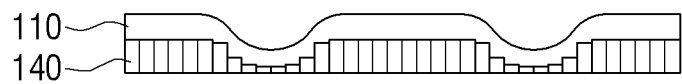

FIG. 18
(a)
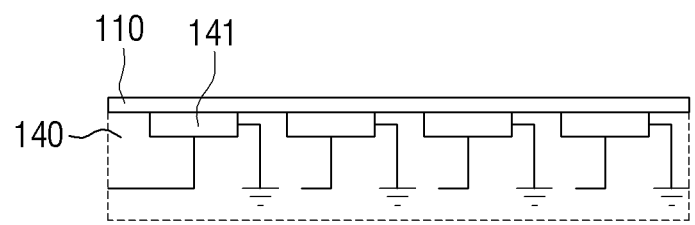
(b)
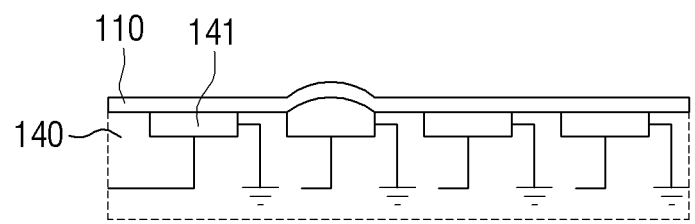

FIG. 19
(a)
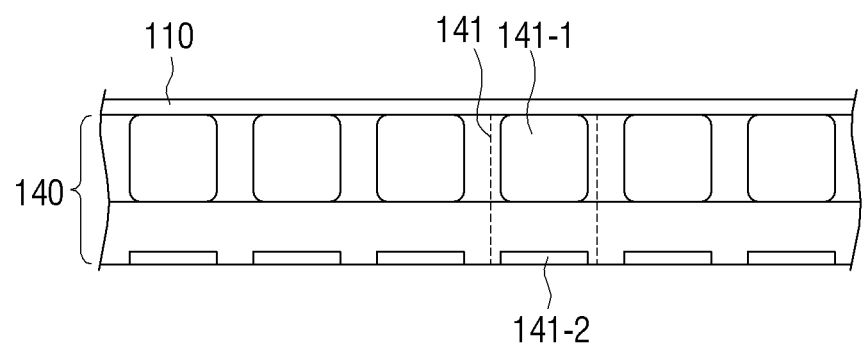
(b)
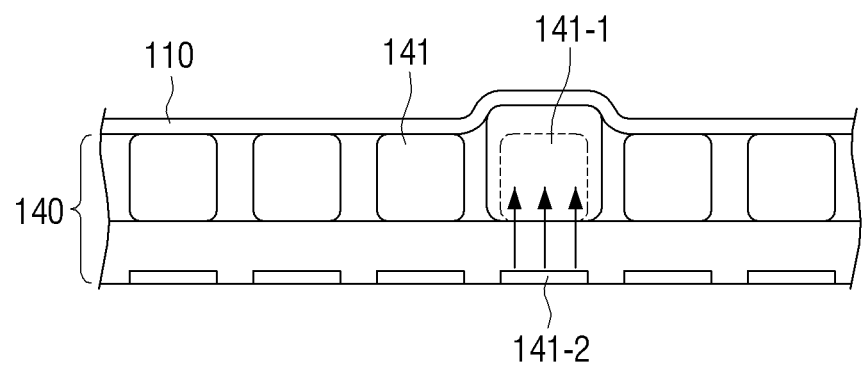

FIG. 21
(a)
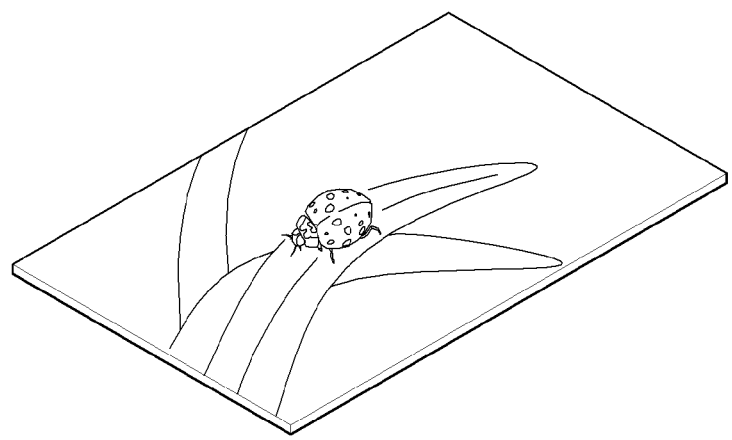
(b)
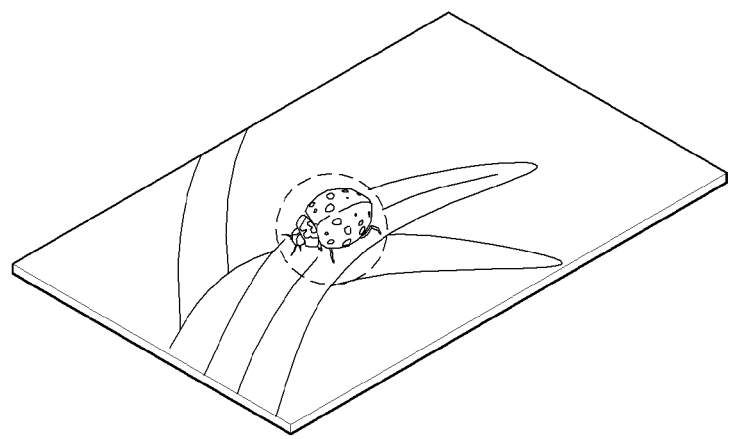
(c)
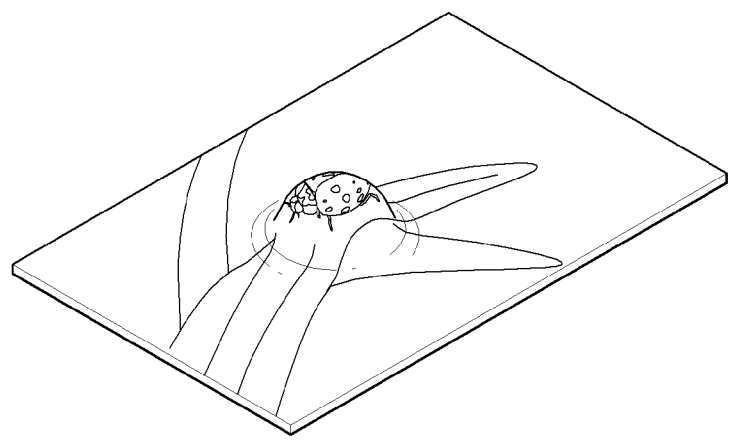

FIG. 26
(a)
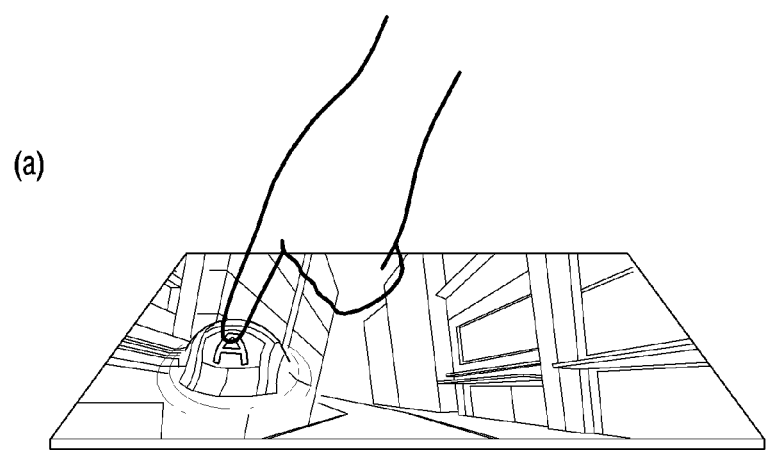
(b)
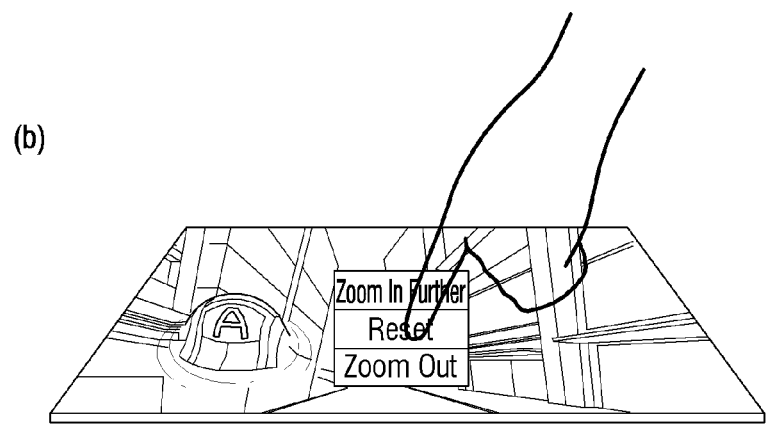
(c)
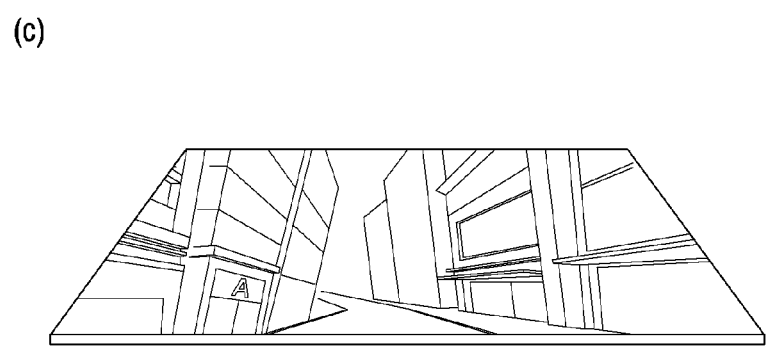

FIG. 32
(a)
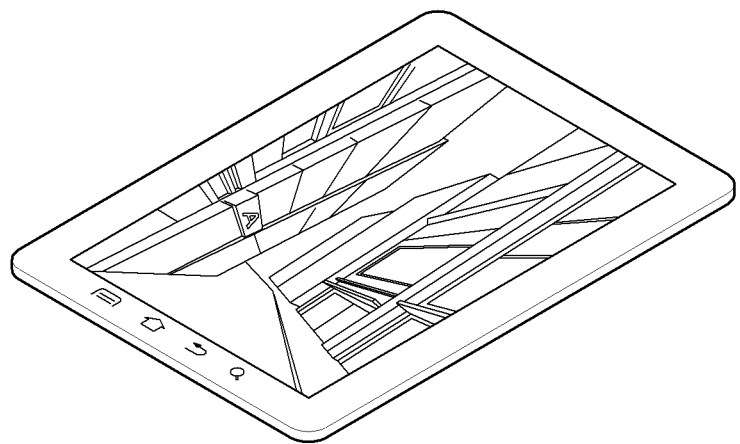
(b)
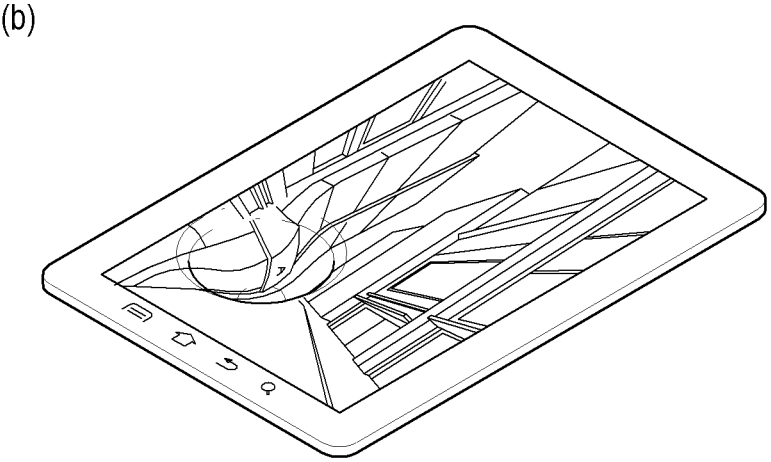

FIG. 33
(a) 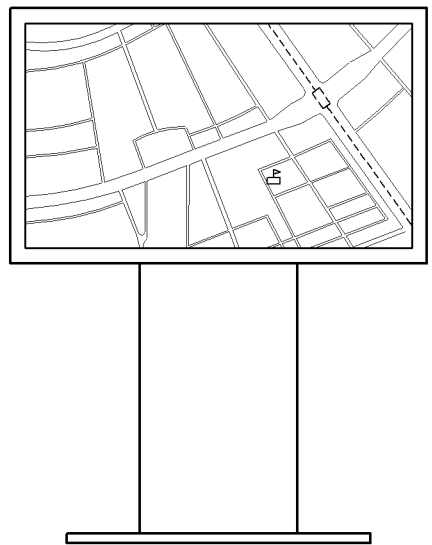
(b) 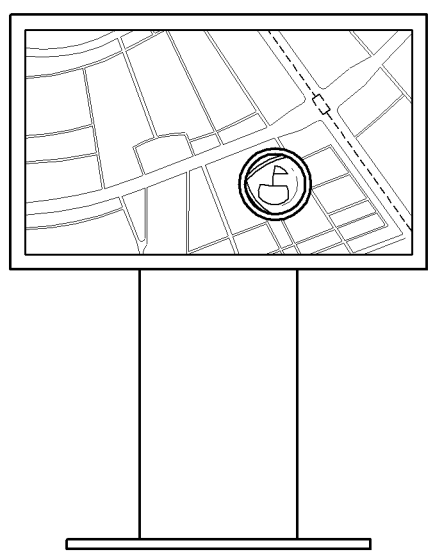

FLEXIBLE DISPLAY APPARATUS AND CONTROL METHOD THEREOF

CROSS-REFERENCE TO RELATED APPLICATION

This application claims priority from Korean Patent Application No. 10-2012-0110321, filed on Oct. 4, 2012 in the Korean Intellectual Property Office, the disclosure of which is incorporated herein by reference in its entirety.

BACKGROUND

1. Field

Apparatuses and methods consistent with exemplary embodiments relate to a flexible display apparatus and a control method thereof. In particular, exemplary embodiments relate, to a flexible display apparatus which changes a display state according to shape deformation, and a control method thereof.

2. Description of the Related Art

With the development of electronic technologies, various kinds of display apparatuses have been developed. In particular, display apparatuses such as television (TVs), personal computers (PCs), laptops, tablet PCs, mobile phones, and MP3 players are widely used.

In order to meet consumer demands for new functions and new forms of displays, new forms of display apparatuses have been developed. One example of a next generation display apparatus is a flexible display apparatus.

The flexible display apparatus is a display apparatus that can be deformed into different shapes, and configured similar to paper.

The flexible display apparatus can be deformed by a force applied by a user. Thus, in the flexible apparatus, there is a need for various method of using shape deformation characteristics of the flexible display apparatus.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a flexible display apparatus, which changes a display state of a display into a convex shape or a concave shape, according to shape deformation of the display, and a control method thereof.

According to an aspect of an exemplary embodiment, there is provided a flexible display apparatus including: a display configured to display an object on a screen; a sensor configured to sense deformation of a shape of the display; and a controller configured to control the display to reconfigure the displayed object according to the deformed shape and display the reconfigured object.

The sensor may sense a first area which corresponds to an area where the display is deformed into a concave shape, or a second area which corresponds to an area where the display is deformed into a convex shape, and the controller may control the display to reconfigure the displayed object on the first area or the second area and display the reconfigured object.

The controller may calculate height information of the sensed first area or the sensed second area.

The controller may reconfigure the displayed object by scaling the displayed object on the first area or the second area, according to the calculated height information, or changes pixels of the displayed object on the first area or the second area, according to the calculated height information.

The controller may reconfigure the object by displaying the displayed object on the first area and an upper menu on the displayed object on the first area, according to the calculated height information.

The controller may reconfigure the object by displaying the displayed object on the second area and a lower menu on the displayed object on the second area, according to the calculated height information.

The controller may reconfigure the object by displaying detailed information on the displayed object on the first area or the second area, according to the calculated height information.

According to an aspect of another exemplary embodiment, there is provided a flexible display apparatus including: a display configured to display an object on a screen; an actuator configured to provide shape deformation to the display; and a controller configured to determine deformation information for reconfiguring and displaying the object, control the actuator to provide the shape deformation according to the determined deformation information, and control the display to reconfigure the displayed object and display the reconfigured object.

The deformation information may be height information for providing the shape deformation to the display.

The controller may control the actuator to deform a first area of the display into a concave shape, or deform a second area of the display into a convex shape using the height information, and the controller may control the display to reconfigure the displayed object on the first area or the second area and display the reconfigured object.

The controller may automatically detect the displayed object from the screen, and may control the actuator to provide the shape deformation using the height information which is mapped onto the detected object.

The flexible display apparatus may further include a sensor configured to sense a touch input of the user on the display, and the controller may control the actuator to provide the shape deformation using the height information which is mapped onto an object selected through the touch input of the user.

The flexible display apparatus may further include a sensor configured to sense the shape deformation of the display which is caused by a pressing input of the user, and, the controller may control the actuator to hold a deformed shape in response to a shape of the display being deformed by the sensed pressing input.

The controller may reconfigure the object by scaling the displayed object on the first area or the second area, according to the height information, or changing pixels of the displayed object on the first area or the second area, according to the calculated height information.

The controller may reconfigure the object by displaying the displayed object on the first area and an upper menu on the displayed object on the first area, according to the height information.

The controller may reconfigure the object by displaying the displayed object on the second area and a lower menu on the displayed object on the second area, according to the calculated height information.

The controller may reconfigure the object by displaying detailed information on the displayed object on the first area or the second area, according to the calculated height information.

According to an aspect of still another exemplary embodiment, there is provided a method for controlling of a flexible display apparatus which includes a display of a shape which is deformable, the method including: displaying an object on a screen of the display; sensing deformation of the shape of the display; and reconfiguring the displayed object according to the deformed shape and displaying the reconfigured object.

The sensing may include sensing a first area which corresponds to an area where the display is deformed into a concave shape, or a second area which corresponds to an area where the display is deformed into a convex shape, and the reconfiguring and displaying may include reconfiguring the displayed object on the first area or the second area and displaying the reconfigured object.

The method may further include calculating height information of the sensed first area or the sensed second area.

The reconfiguring and displaying may include reconfiguring and displaying the object by scaling the displayed object on the first area or the second area, according to the calculated height information, or changing pixels of the displayed object on the first area or the second area, according to the calculated height information.

The reconfiguring and displaying may include reconfiguring and displaying the object by displaying the displayed object on the first area and an upper menu on the displayed object on the first area, according to the calculated height information.

The reconfiguring and displaying may include reconfiguring and displaying the object by displaying the displayed object on the second area and a lower menu on the displayed object on the second area, according to the calculated height information.

The reconfiguring and displaying may include reconfiguring and displaying the object by displaying detailed information on the displayed object on the first area or the second area, according to the calculated height information.

According to an aspect of still another exemplary embodiment, there is provided a method for controlling of a flexible display apparatus which includes a display of a shape which is deformable, the method including: displaying an object on a screen of the display; determining deformation information for reconfiguring and displaying the object; providing, by an actuator, shape deformation to the display according to the determined deformation information; and reconfiguring the displayed object and displaying the reconfigured object.

The deformation information may be height information for providing the shape deformation to the display.

The providing may include deforming a first area of the display into a concave shape, or deforming a second area of the display into a convex shape using the height information, and the reconfiguring and displaying may include reconfiguring the displayed object on the first area or the second area and displaying the reconfigured object.

The method may further include automatically detecting the displayed object from the screen, and the providing may include providing the shape deformation using the height information which is mapped onto the detected object.

The method may further include sensing a touch input of the user to the display, and the providing may include providing the shape deformation using the height information which is mapped onto an object selected through the touch input of the user.

The method may further include: sensing shape deformation of the display which is caused by a pressing input of the user; and providing, by the actuator, shape deformation to hold a deformed shape in response to a shape of the display being deformed by the sensed pressing input.

The reconfiguring and displaying may include reconfiguring and displaying the object by scaling the displayed object on the first area or the second area, according to the height information, or changing pixels of the displayed object on the first area or the second area, according to the height information.

The reconfiguring and displaying may include reconfiguring and displaying the object by displaying the displayed object on the first area and an upper menu on the displayed object on the first area, according to the height information.

The reconfiguring and displaying may include reconfiguring and displaying the object by displaying the displayed object on the second area and a lower menu on the displayed object on the second area, according to the height information.

The reconfiguring and displaying may include reconfiguring and displaying the object by displaying detailed information on the displayed object on the first area or the second area, according to the calculated height information.

According to an aspect of still another exemplary embodiment, there is provided a flexible display apparatus including: a substrate configured to be deformable by an external pressure; a display panel which comprises a plurality of pixels; a driver configured to drive the display panel; and a protection layer configured to protect the display panel by being disposed on the display panel.

BRIEF DESCRIPTION OF THE DRAWINGS

The above and/or other aspects will be more apparent by describing in detail exemplary embodiments, with reference to the accompanying drawings, in which:

FIGS. 3 to 5 are views illustrating an example of a method for sensing bending of a flexible display apparatus according to various exemplary embodiments;

FIG. 6 is a view illustrating a method for sensing a bending direction using overlapping bend sensors according to various exemplary embodiments;

FIG. 8 is a plane view to illustrate a method for correcting a touch parameter according to shape deformation of the flexible display apparatus;

FIGS. 9 to 12 are views illustrating a display state which is changed according to a pressing input of a user according to a first exemplary embodiment;

FIGS. 14 to 20 are views to illustrate an operation of an actuator according to the second exemplary embodiment;

FIGS. 21 to 26 are views to illustrate shape deformation of a display according to the second exemplary embodiment;

FIG. 32 is a view illustrating a flexible display apparatus which is implemented as a tablet PC according to various exemplary embodiments.

FIG. 33 is a view illustrating a flexible display apparatus which is implemented as a kiosk according to various exemplary embodiments.

DETAILED DESCRIPTION OF EXEMPLARY EMBODIMENTS

Figure 1:
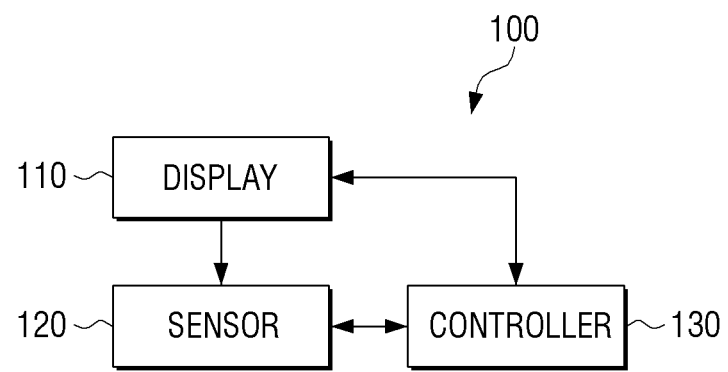
FIG. 1 is a block diagram illustrating a configuration of a flexible display apparatus according to a first exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

<#1: First Exemplary Embodiment>

FIG. 1 is a block diagram illustrating a configuration of a flexible display apparatus according to a first exemplary embodiment. Referring to FIG. 1, a flexible display apparatus 100 includes all or some of a display 110, a sensor 120, and a controller 130. The flexible display apparatus 100 may be implemented using various kinds of portable apparatuses which are easy to carry and have a display function, such as a mobile phone, a smartphone, a portable multimedia player (PMP), a personal digital assistant (PDA), a tablet PC, and a navigation system. The flexible display apparatus 100 may be implemented using stationary apparatuses such as a monitor, a television (TV), and a kiosk.

The display 110 displays various screens. In particular, the display 110 may display a screen including various objects. The object recited may be a variety of objects that are included in an image, a moving image, and a text. However, the object is not limited to the above. The object may be all kinds of objects that can be displayed on the display 110, such as a movie content, a photo content, and a widget.

The display 110 may display a content playback screen or an execution screen such as an image, a moving image, a text, and music, and may display various user interface (UI) screens. For example, when a content is played back through an application installed in the flexible display apparatus 100, the display 110 may display a content playback screen provided by the corresponding application.

The flexible display apparatus 100 including the display 110 can be bent. Accordingly, the flexible display apparatus 100 and the display 110 may have a flexible structure, and may be manufactured using a flexible material. Hereinafter, a detailed configuration of the display 110 will be explained with reference to FIG. 2.

Figure 2:
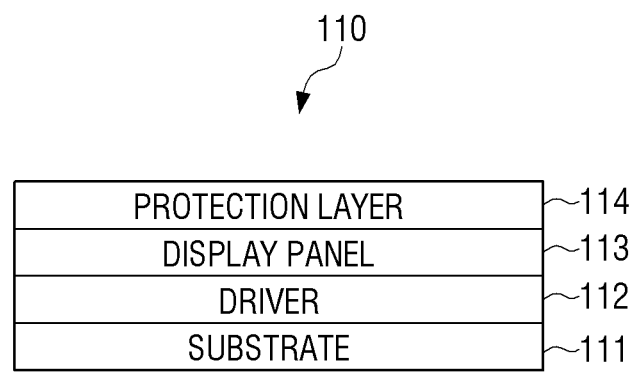
FIG. 2 is a view illustrating a basic configuration of a display of a flexible display apparatus according to various exemplary embodiments.

FIG. 2 is a view to illustrate a basic configuration of a display which constitutes a flexible display apparatus according to an exemplary embodiment. Referring to FIG. 2, the display 110 includes a substrate 111, a driver 112, a display panel 113, and a protection layer 114.

The flexible display apparatus refers to an apparatus which can be bent, crooked, folded, or rolled like paper, while having display characteristics of an existing flat panel display apparatus. Accordingly, the flexible display apparatus should be manufactured on a flexible substrate.

In particular, the substrate 111 may be implemented by a plastic substrate (e.g., a high molecular film) which is deformable by an external pressure.

The plastic substrate has a structure which is formed by performing barrier coating on opposite surfaces of a base film. The base film may be implemented using various resins such as polyimide (PI), polycarbonate (PC), polyethyleneterephtalate (PET), polyethersulfone (PES), polyethylenenaphthalate (PEN), and fiber reinforced plastic (FRP). The barrier coating is performed on the opposite surfaces of the base film, and an organic membrane or an inorganic membrane may be used for the purpose of maintaining flexibility.

The substrate 111 may be formed of a flexible material, such as thin glass or metal foil besides the plastic substrate.

The driver 112 drives the display panel 113. In particular, the driver 112 applies driving voltage to a plurality of pixels constituting the display panel 113, and may be implemented using a-si, TFT, low temperature poly silicon (LTPS) TFT, organic TFT (OTFT). The driver 112 may also be implemented in various forms according to the form of the display panel 113. For instance, the display panel 113 may include an organic light emitting substance which consists of a plurality of pixel cells and an electrode layer which covers opposite surfaces of the organic light emitting substance. In this case, the driver 112 may include a plurality of transistors corresponding to the plurality of pixel cells of the display panel 113. The controller 130 applies an electric signal to a gate of each transistor and controls the pixel cell connected to the transistor to emit light. Accordingly, an image is displayed.

Also, the display panel 113 may be implemented using electroluminescence (EL), an electrophoretic display (EPD), an electrochromic display (ECD), a liquid crystal display (LCD), an active matrix LCD (AMLCD), or a plasma display panel (PDP), besides the organic light emitting diode (OLED). However, the LCD cannot emit light by itself. Thus, the LCD requires a separate backlight unit. When the LCD does not use the backlight unit, it uses ambient light. In order to use the LCD display panel 113 without the backlight unit, an outdoor environment, which contains plenty of light, may be used to operate the LCD.

The protection layer 114 protects the display panel 113. For example, the protection layer 114 may be made of ZrO, CeO₂, or ThO₂. The protection layer 114 may be manufactured as a transparent film, and may cover the entire surface of the display panel 113.

Unlike in FIG. 2, the display 110 may be implemented using electronic paper (e-paper). The e-paper is a display which applies general ink characteristics to paper, and is different from a general flat panel display in that it uses reflective light. The electronic paper may change a picture or text using electrophoresis, which uses a twist ball or a capsule.

When the display 110 is comprised of elements of a transparent material, the display 110 may be implemented as a display apparatus which is bendable and has transparency. For example, when the substrate 111 is made of a polymer material such as plastic having transparency, the driver 112 is implemented by a transparent transistor, and the display panel 113 is implemented using a transparent organic light emitting substance and a transparent electrode, the display 110 has transparency.

The transparent transistor refers to a transistor which is manufactured by substituting opaque silicon of an existing thin film transistor with a transparent material such as transparent zinc-oxide or titanium oxide. The transparent electrode may be made of advanced materials such as indium tin oxide (ITO) or graphene. Graphene is a material which has a planar structure of a honeycomb shape in which carbon atoms are connected to one another, and has transparency. The transparent organic light emitting layer may be implemented by using various materials.

As described above, the display 110 can be bent by an external force. Thus, the display 110 has its shape changed. Hereinafter, a method for sensing bending of the flexible display apparatus 100 will be explained with reference to FIGS. 3 to 5.

Figure 5:
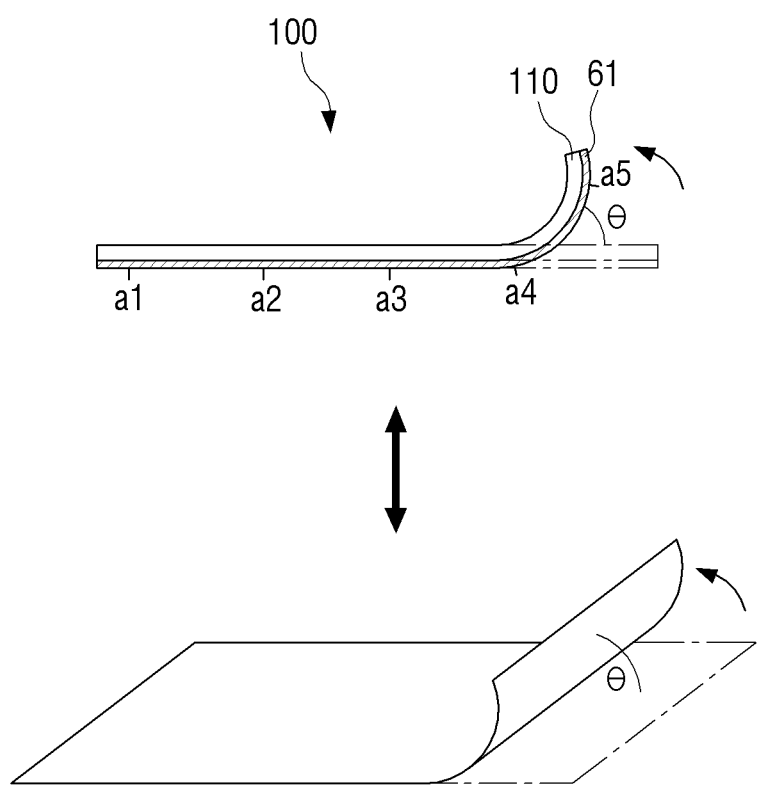

FIGS. 3 to 5 are views to illustrate an example of a method for sensing bending of the flexible display apparatus according to an exemplary embodiment.

The sensor 120 senses bending of the display 110. The "bending" recited herein refers to a state in which the display 110 is bent.

To achieve the bending, the sensor 120 includes a bend sensor which is disposed on one surface such as a front surface or a rear surface of the display 110, or a bend sensor which is disposed on opposite surfaces of the display 110.

The bend sensor recited herein refers to a sensor that can be bent and has a resistance value which varies according to a degree of bending. The bend sensor may be implemented in various forms such as an optical fiber bend sensor, a pressure sensor, and a strain gauge.

FIG. 3 is a view illustrating arrangements of bend sensors according to an exemplary embodiment.

View (a) of FIG. 3 illustrates an example of a plurality of bar-shaped bend sensors which are arranged in the display 110 in a vertical direction and a horizontal direction (i.e., a grid pattern). In particular, the bend sensors includes bend sensors 11-1 to 11-5 which are arranged in a first direction, and bend sensors 12-1 to 12-5 which are arranged in a second direction. The second direction is perpendicular to the first direction. The bend sensors are disposed away from one another by a predetermined distance.

In view (a) of FIG. 3, five bend sensors (11-1 to 11-5, 12-1 to 12-5) are arranged in each of the horizontal direction and the vertical direction in a grid formation. However, this is merely an example, and the number of bend sensors may be changed according to a size of the display 110. The bend sensors are arranged in the horizontal direction and the vertical direction to sense bending from the entire area of the display 110. Therefore, when only a part of the flexible display apparatus is flexible, or when the flexible display apparatus needs to sense bending from only a part of the apparatus, the bend sensor may be arranged in only a corresponding portion of the apparatus.

The bend sensors may be embedded in a front surface of the display 110 as shown in view (a) of FIG. 3. However, this is merely an example, and the bend sensors may be embedded in a rear surface of the display 110 or may be embedded in both surfaces.

The shapes, number, and locations of the bend sensors may be variously changed. For example, a single bend sensor or a plurality of bend sensors may be connected with the display 110. The single bend sensor may sense a single bending data and may have a plurality of sensing channels to sense a plurality of bending data.

View (b) of FIG. 3 illustrates an example of a single bend sensor which is disposed on one surface of the display 110. As shown in view (b) of FIG. 3, a bend sensor 21 may be arranged in the front surface of the display 110 in a circular form. However, this is merely an example and the bend sensor may be arranged in the rear surface of the display 110, and may be implemented in a form of a looped curve forming various polygons such as a quadrangle.

View (c) of FIG. 3 illustrates two bend sensors which intersect. Referring to view (c) of FIG. 3, a first bend sensor 22 is disposed on a first surface of the display 110 in a first diagonal direction, and a second bend sensor 23 is disposed on a second surface of the display 110 in a second diagonal direction.

Although line type bend sensors are used in the above-described various exemplary embodiments, the sensor 120 may sense bending using a plurality of strain gages.

View (d) of FIG. 3 illustrates a plurality of strain gages which are arranged in the display 110. The strain gage uses metal or a semiconductor in which a resistance is greatly changed according to an applied force, and senses deformation of a surface of an object to be measured according to a change in the resistance value. It is common that a material such as metal increases a resistance value when its length is stretched by an external force, and decreases the resistance value when the length is contracted. Accordingly, bending is sensed by sensing a change in the resistance value.

Referring to view (d) of FIG. 3, a plurality of strain gages 30-1, 30-2, . . . , 30-$n$, . . . , 30-$m$, . . . ) are arranged along an edge of the display 110. The number of strain gages may be changed according to a size or a shape of the display 110, or sensing of predetermined bending, and a resolution, etc.

Hereinafter, a method for the sensor 120 to sense bending of the display 110 using bend sensors which are arranged in a grid formation or strain gages will be explained.

The bend sensor may be implemented using an electric resistance sensor which uses an electric resistance, or a micro optical fiber sensor which uses a strain of an optical fiber. Hereinafter, the bend sensor will be explained with the assumption that the bend sensor is the electric resistance sensor for the convenience of explanation.

FIG. 4 is a view to illustrate a method for sensing bending of the flexible display apparatus according to an exemplary embodiment.

Hereinafter, it is assumed that the surface of the display 110 is placed on a 2-dimensional x-y plane for convenience of explanation.

When the display 110 is bent, the bend sensors, which are arranged on one surface or opposite surfaces of the display 110, are also bent and output resistance values corresponding to a magnitude of exerted tension.

In other words, the sensor 120 may sense a resistance value of the bend sensor using a level of a voltage applied to the bend sensor or an intensity of a current flowing in the bend sensor, and may sense bending of the display 110 using the sensed resistance value.

When the display 110 is bent so that a bending line is formed in a vertical direction and a Z+ direction as shown in view (a) of FIG. 4, bend sensors 41-1 to 41-5 which are embedded in the front surface of the display 110 are also bent and output resistance values according to a magnitude of exerted tension.

In this case, the magnitude of the tension increases in proportion to a degree of bending. For example, when the display 110 is bent as shown in view (a) of FIG. 4, the bending occurring in the center area is the greatest. Accordingly, the greatest tension is exerted to a point a3 of the bend sensor 41-1, a point b3 of the bend sensor 41-2, a point c3 of the bend sensor 41-3, a point d3 of the bend sensor 41-4, and a point e3 of the bend sensor 41-5, which is the center area. Accordingly, the bend sensors 41-1 to 41-5 have the greatest resistance value at the points a3, b3, c3, d3, and e3.

On the other hand, the degree of bending gradually decreases toward the outside. Accordingly, the bend sensor 41-1 has smaller resistance values as it goes away from the point a3 to the right and left, and has the same resistance value as that before the bending occurs at the point a1 and a left area of the point a1 and at the point a5 and a right area of the point a5 where bending does not occur. The same degree of bending is applied to the other bend sensors 41-2 to 41-5.

The controller 140 may determine bending of the display 110 based on a result of sensing by the sensor 120. Specifically, the controller 130 may determine a location of a bending area, a size of the bending area, a number of bending areas, a size of a bending line, a location of the bending line, a number of bending lines, a direction of the bending line, and a number of times that bending occurs, based on a relationship between the points where a change in the resistance value of the bend sensor is sensed.

A bending area is an area in which the display 110 is bent. Since the bend sensor is also bent as the flexible display apparatus 100 is bent, all points at which the bend sensors output different resistance values from those in the original state may delineate a bending area. On the other hand, an area where there is no change in the resistance value may delineate a flat area in which bending is not performed, Accordingly, when a distance between the points at which the change in the resistance value is sensed lies within a predetermined distance, the points are sensed as one bending area. On the other hand, when the distance between the points at which the change in the resistance value is sensed lies beyond the predetermined distance, different bending areas are delineated with reference to these points.

As described above, in view (a) of FIG. 4, the resistance values from the points a1 to a5 of the bend sensor 41-1, from the points b1 to b5 of the bend sensor 41-2, from the points c1 to c5 of the bend sensor 41-3, from the points d1 to d5 of the bend sensor 41-4, and from the points e1 to e5 of the bend sensor 41-5 are different from the resistance values of the original state. In this case, the points at which the change in the resistance value is sensed in each bend sensor 41-1 to 41-5 are located within a predetermined distance, and are continuously arranged.

Accordingly, the controller 130 determines an area 42 which includes all of the points, from the points a1 to a5 of the bend sensor 41-1, from the points b1 to b5 of the bend sensor 41-2, from the points c1 to c5 of the bend sensor 41-3, from the points d1 to d5 of the bend sensor 41-4, and from the points e1 to e5 of the bend sensor 41-5, as one bend area.

The bending area may include a bending line. The bending line refers a line which connects the points at which the greatest resistance value is sensed in each bending area.

Accordingly, the controller 130 may determine a line connecting points at which the greatest resistance value is sensed in the bending area as a bending line.

For instance, in the case of view (a) of FIG. 4, a line 43, which connects the point a3 at which the greatest resistance value is output in the bend sensor 41-1, the point b3 at which the greatest resistance value is output in the bend sensor 41-2, the point c3 at which the greatest resistance value is output in the bend sensor 41-3, the point d3 at which the greatest resistance value is output in the bend sensor 41-4, and the point e3 at which the greatest resistance value is output in the bend sensor 41-5, may delineate a bending line. View (a) of FIG. 4 illustrates the bending line which is formed in the center area of the display surface in the vertical direction.

View (a) of FIG. 4 illustrates only the bend sensors that are arranged in the horizontal direction from among the bend sensors arranged in the grid formation to explain the case in which the display 110 is bent so that the bending line is formed in the vertical direction. In other words, the sensor 120 may sense the display 110 being bent so that a bending line is formed in the horizontal direction through the bend sensors which are arranged in the vertical direction. Also, when the display 110 is bent so that a bending line is formed in a diagonal direction, tension is exerted to all of the bend sensors which are arranged in the horizontal and vertical directions. Therefore, the sensor 120 may sense bending of the display 110 in the diagonal direction based on outputs values of the bend sensors arranged in the horizontal and vertical directions.

Also, the sensor 120 may sense bending of the display 110 using a strain gage.

Specifically, when the display 110 is bent, a force is exerted to strain gages which are arranged along an edge of the display 110, and the strain gages output different resistance values according to the applied force. Accordingly, the controller 130 may determine a location of a bending area, a size of the bending area, a number of bending areas, a size of a bending line, a location of the bending line, a number of bending lines, a direction of the bending line, and a number of times that bending occurs, based on output values of the strain gages.

For example, when the display 110 is bent so that the bending line is formed in the vertical direction as shown in view (b) of FIG. 4, a force is exerted to strain gages 51-$p$, . . . , 51-$p$+5, 51-$r$, . . . , 51-$r$+5 that are arranged around a bent area from among a plurality of strain gages embedded in the front surface of the display 110, and the strain gages 51-$p$, . . . , 51-$p$+5, 51-$r$, . . . , 51-$r$+5 output resistance values corresponding to the applied force. Accordingly, the controller 130 may determine an area 51 that includes all points at which the strain gages output resistance values different from those of the original state, as one bending area.

Also, the controller 130 may determine a line connecting at least two strain gages that output resistance values greatly different from those of the original state in the bending area as a bending line. In other words, the controller 130 may determine a line connecting at least two strain gages to which the greatest force is exerted, or at least two strain gages to which the greatest force and the next greatest force are exerted as a bending line according to the bending of the display 110, as a bending line.

For example, when the display 110 is bent so that the bending line is formed in the vertical direction as shown in view (b) of FIG. 4, the display 110 may determine a line connecting the first strain gage 51-$p$+2 and the second strain gage 51-r+3 which output resistance values greatly different from those of the original state as a bending line.

In the above-described exemplary embodiment, the strain gages 51-1, 51-2, . . . are embedded in the front surface of the flexible display apparatus 100. However, this is merely an example. The strain gages may be embedded in the rear surface or opposite surfaces of the display 110.

The sensor 120 may sense a degree of bending of the display 110, i.e., a bending angle. The bending angle recited herein may refer to an angle which is formed when the display 110 is bent in comparison with a flat state of the display 110.

FIG. 5 is a view to illustrate a method for determining a bending angle of the display of the flexible display apparatus according to an exemplary embodiment.

The controller 130 may determine a bending angle of the display 110 based on a result of sensing by the sensor 120. To determine the bending angle of the display 110, the flexible display apparatus 100 may pre-store resistance values which are output from a bending line according to a bending angle of the display 110. In particular, the controller 130 may determine the bending angle of the display 110 by comparing resistance values which are output from bend sensors or strain gages disposed along the bending line when the display 110 is bent, with the pre-stored resistance values.

For example, when the display 110 is bent as shown in FIG. 5, a bend sensor point a4 located in a bending line outputs the greatest resistance value. At this time, the flexible display apparatus 100 determines a bending angle (θ) that matches the resistance value output from the point a4 using the resistance values which are pre-stored according to the bending angles.

In this case, the controller 130 may perform an appropriate operation according to the bending angle. For example, when the display 110 is bent at a great angle while a channel zapping operation is performed, the controller 130 may increase a channel zapping speed or may extend a channel zapping range. On the other hand, when the bending angle is low, the channel zapping is performed more slowly or within a smaller number of channels. Volume control or content conversion may be performed differently according to the bending angle.

As described above, the bending direction of the flexible display apparatus 100 is divided into the Z+ direction and the Z− direction, and the sensor 120 may sense the bending direction of the flexible display apparatus 100. A detailed description of this will be provided with reference to FIGS. 6 and 7.

FIG. 6 is a view to illustrate a method for sensing a bending direction using a bend sensor according to an exemplary embodiment.

The controller 130 may determine a bending direction of the display 110 based on a result of sensing by the sensor 120. To achieve this, the sensor 120 may include a bend sensor which is disposed in various ways.

For example, the sensor 120 may include two bend sensors 71 and 72 which are disposed overlapping each other on one side of the display 110 as shown in view (a) of FIG. 6. In this case, when bending is performed in one direction, different resistance values are output from the upper bend sensor 71 and the lower bend sensor 72 at a point where the bending is performed. Accordingly, the controller 130 may determine a bending direction by comparing the resistance values of the two bend sensors 71 and 72 at the same point.

In particular, when the display 110 is bent in the Z+ direction as shown in view (b) of FIG. 6, tension exerted to the lower bend sensor 72 is greater than that of the upper bend sensor 71 at a point 'A' corresponding to a bending line. On the other hand, when the display 110 is bent in the Z− direction, tension exerted to the upper bend sensor 71 is greater than that of the lower bend sensor 72.

Accordingly, the controller 130 may determine the bending direction by comparing the resistance values of the two bend sensors 71 and 72 at the point A. In other words, the controller 130 may determine that the display 110 is bent in the Z+ direction when the resistance value output from the lower bend sensor of the two overlapping bend sensors is greater than the resistance value output from the upper bend sensor at the same point. The controller 130 may determine that the display 110 is bent in the Z− direction when the resistance value output from the upper bend sensor of the two overlapping bend sensors is greater than the resistance value output from the lower bend sensor at the same point.

Although the two bend sensors are disposed overlapping each other on one side of the display 110 in views (a) and (b) of FIG. 6, the sensor 120 may include bend sensors which are disposed on opposite surfaces of the display 110 as shown in view (c) of FIG. 6.

View (c) of FIG. 6 illustrates two bend sensors 73 and 74 which are disposed on the opposite surfaces of the display 110.

Accordingly, when the display 110 is bent in the Z+ direction, the bend sensor which is disposed on a first surface of the opposite surfaces of the display 110 is subject to a compressive force, whereas the bend sensor which is disposed on a second surface is subject to tension. On the other hand, when the display 110 is bent in the Z− direction, the bend sensor disposed on the second surface is subject to a compressive force, whereas the bend sensor disposed on the first surface is subject to tension. As described above, the different values are detected from the two bend sensors according to the bending direction and the controller 130 determines the bending direction according to a detection characteristic of the value.

Although the bending direction is sensed using the two bend sensors in views (a) to (c) of FIG. 6, the bending direction may be determined by means of only a strain gage disposed on one surface or opposite surfaces of the display 110.

Figure 7:
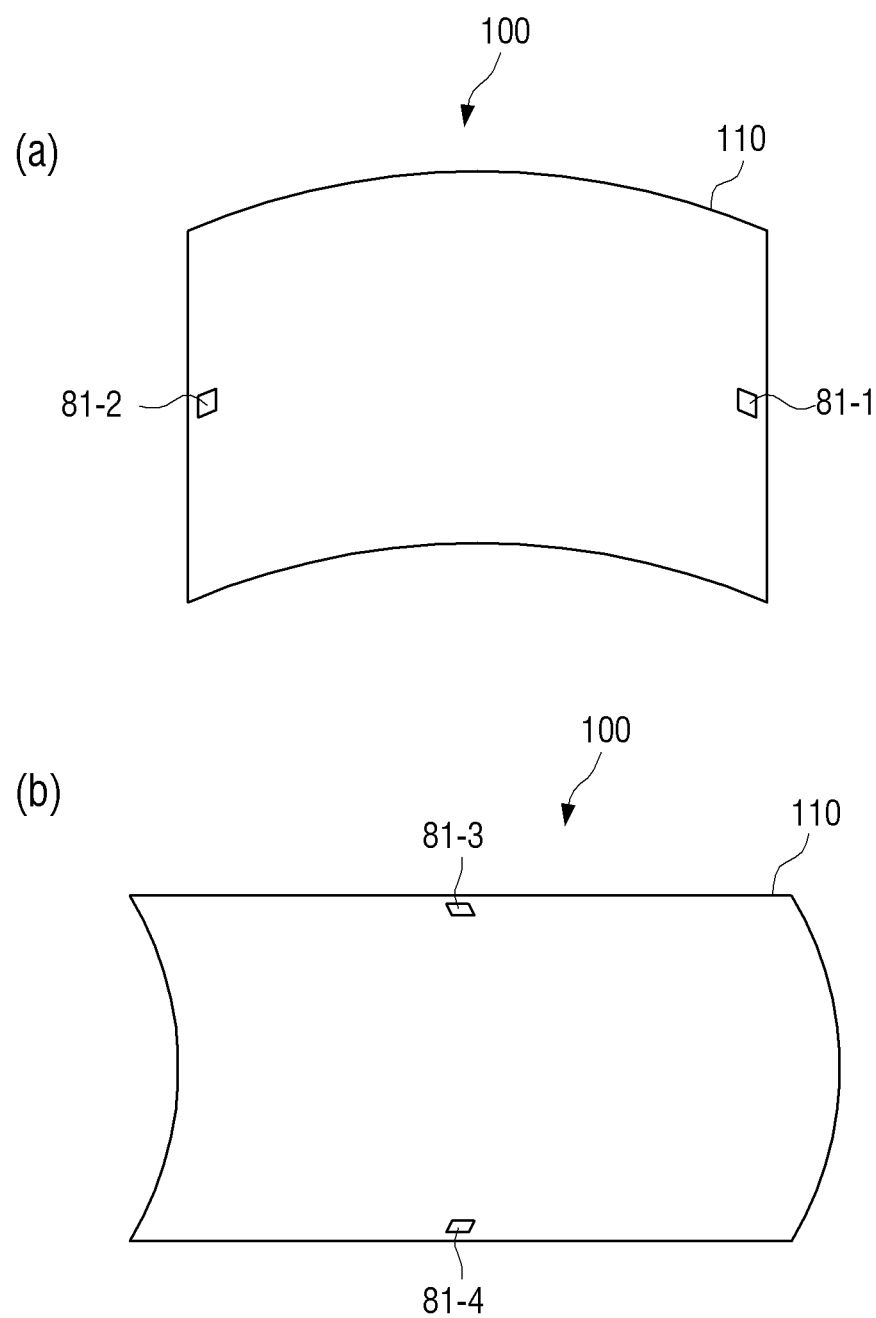
FIG. 7 is a view illustrating a method for sensing a bending direction according various exemplary embodiments.

FIG. 7 is a view to illustrate a method for sensing a bending direction according to another exemplary embodiment. Specifically, views (a) and (b) of FIG. 7 are views to illustrate a method for sensing a bending direction using an acceleration sensor for example.

The sensor 120 may include a plurality of acceleration sensors which are disposed on edge areas of the display 110. The controller 130 may determine a bending direction of the display 110 based on a result of sensing by the sensor 120.

The acceleration sensor is a sensor that measures acceleration of a motion and a direction of the acceleration. In particular, the acceleration sensor outputs a sensing value corresponding to acceleration of gravity which changes according to a slope of an apparatus where that sensor is attached.

Accordingly, when the acceleration sensors 81-1 and 81-2 are disposed on opposite edges of the display 110 as shown in view (a) of FIG. 7, output values sensed by the acceleration sensors 81-1 and 81-2 are changed when the display 110 is bent. The controller 130 calculates a pitch angle and a roll angle using the output values sensed by the acceleration sensors 81-1 and 81-2. Accordingly, the controller 130 may determine a bending direction based on changes in the pitch angle and the roll angle sensed by the acceleration sensors 81-1 and 81-2.

In view (a) of FIG. 7, the acceleration sensors 71-1 and 71-2 are disposed on opposite edges in the horizontal direction with reference to the front surface of the display 110. However, the acceleration sensors may be disposed in the vertical direction as shown in view (b) of FIG. 7. In this case, when the display 110 is bent in the vertical direction, the controller 130 may determine a bending direction according to measurement values sensed by the acceleration sensors 81-3 and 81-4 in the vertical direction.

In views (a) and (b) of FIG. 7, the acceleration sensors are disposed on the left and right edges or the upper and lower edges of the display 110. However, the acceleration sensors may be disposed all of the left, right, upper and right edges or may be disposed on corners.

The bending direction may be sensed using a gyro sensor or a geomagnetic sensor, instead of the acceleration sensor described above. The gyro sensor refers to a sensor which, when a rotational motion occurs, detects an angular velocity by measuring a Coriolis force exerted in a velocity direction of the motion. Based on a measurement value of the gyro sensor, a direction of the rotational motion can be sensed. Thus, a bending direction can also be sensed. The geomagnetic sensor refers to a sensor which senses azimuth using a 2-axis or 3-axis fluxgate. When such a geomagnetic sensor is applied, the geomagnetic sensor disposed on each edge of the flexible display apparatus 100 suffers from location movement when the edge is bent, and outputs an electric signal corresponding to a change in geomagnetism caused by the location movement. The flexible display apparatus may calculate a yaw angle using the value output from the geomagnetic sensor. According to a change in the calculated yaw angle, various bending characteristics such as a bending area and a bending direction can be determined.

As described above, the controller 130 may determine bending of the display 110 based on the result of sensing by the sensor 120. The configurations of the sensors and the sensing methods described above may be applied to the flexible display apparatus 100 individually or may be applied in combination.

In the above-described exemplary embodiment, the display 110 is bent. However, since the display 110 is bent along with the flexible display apparatus 100, sensing bending of the display 110 may be regarded as sensing bending of the flexible display apparatus 100. In other words, the configuration to sense bending may be provided in the flexible display apparatus 100, and the controller 130 may determine bending of the flexible display apparatus 100 based on a result of sensing.

The sensor 120 may sense a touch manipulation of a user on a screen of the display 110. In this case, the sensor 120 may include a resistive or capacitive touch sensor, and the controller 130 may determine coordinates of a point of the display 110 where the user touches based on an electric signal transmitted from the sensor 120.

However, when the shape of the display 110 is deformed, touch sensitivity or a touch location in the deformed area may be different from that before the shape is deformed. In this case, when the shape of the display 110 is deformed, the controller 130 may correct a touch parameter according to the deformed shape. In other words, when shape deformation of the display 110 is sensed through the sensor 120, the controller 130 may determine a shape deformation area, a bending direction, a bending angle, etc., and may correct the touch parameter in the deformed area using the bending direction, the bending angle, etc. The touch parameter recited herein includes a parameter indicating a touch location and a parameter regarding pressure at a touch point. This may vary according to a touch recognizing method. This will be explained in detail below with reference to FIG. 8.

FIG. 8 is a plane view to illustrate a method for correcting a touch parameter according to shape deformation of the flexible display apparatus. Referring to FIG. 8, the flexible display apparatus 100 includes a touch screen panel 600, a touch location 610 to be touched, and surrounding areas 620 and 630 of the touch location 610. The touch screen panel 600 may be disposed in the display 110 or on a top of the display 110.

When the flexible display apparatus 100 is bent so that bending lines are formed in a vertical direction and in a Z+ direction, the touch screen panel 600 may have a shape as shown in view (a) of FIG. 8. In this case, left and right surrounding areas 620 get closer to each other with reference to the bending area. Further, touch sensitivity increases. On the other hand, upper and lower surrounding areas 630 are less deformed. Thus, there is little change in the touch sensitivity in the upper and lower surrounding areas 630. Accordingly, the controller 130 may correct the touch parameter so that the touch sensitivity of the left and right surrounding areas 620 is reduced.

When a local area of the flexible display apparatus 100 is deformed into a convex shape in the Z+ direction, the touch screen panel 600 may have a shape as shown in view (b) of FIG. 8. In this case, coordinates of the surrounding areas 620 and 630 move away from each other. Thus, touch sensitivity is reduced. Accordingly, the controller 130 may correct the touch parameter so that the touch sensitivity of the surrounding areas 620 and 630 is increased.

When a local area of the flexible display apparatus 100 is deformed into a concave shape in the Z− direction, the touch screen panel 600 may have a shape as shown in view (a) of FIG. 8. In this case, the coordinates of the surrounding areas get close to each other and the touch sensitivity of the coordinates of the surrounding areas 620 and 630 is increased. Accordingly, the controller 130 may correct the touch parameter so that the touch sensitivity of the surrounding areas 620 and 630 is reduced.

Also, when the shape of the flexible display apparatus 100 is deformed as shown in FIG. 8, a location of a touch which is input to the deformed area is different from before the shape is deformed. Therefore, to solve this problem, the controller 130 may correct the touch parameter.

In other words, the controller 130 may increase or reduce the touch sensitivity according to the deformed shape of the flexible display apparatus 100, or may correct the touch location to be touched. Increasing the touch sensitivity may refer to shortening a generation period of a signal corresponding to a touch event, etc.

Also, the sensor 120 may sense a manipulation of pressing the screen of the display 110. In other words, the flexible display apparatus has flexibility to have its shape deformed. Thus, when the user presses a local area, its shape may be deformed. For example, when the user presses down on a certain area on the surface of the display 110 in the vertical direction, the certain area of the flexible display apparatus 100 may be deformed into a concave shape. Further, when the user presses up on a certain area under the surface of the display 110 in the vertical direction, the certain area of the flexible display apparatus 100 may be deformed into a convex shape.

In this case, the sensor 120 may sense a change in the resistance value output from the bend sensor, and may transmit a sensed signal to the controller 130. In this case, the controller 130 may determine a location of the concave local area or the convex local area using coordinate values of a point at which the bend sensor outputs the greatest resistance value, and coordinate values of a point at which the bend sensor outputs a resistance value greater than a predetermined value.

The controller 130 may calculate a difference between the resistance value of the point at which the greatest resistance value is output and the smallest resistance value in the location of the concave local area or the convex local area. Accordingly, the controller 130 may calculate height information of the concave local area or the convex local area which is formed by a pressing input applied by the user. In particular, the flexible display apparatus 100 may match the height information and the resistance values, and may store the matched values. Accordingly, the flexible display apparatus may calculate the height information of the concave local area or the convex local area which is formed by the applied pressing input, by detecting the height information corresponding to the calculated difference between the resistance values. The height information recited herein may refer to a height value of the convex local area in the Z+ direction or a height value of the concave local area in the Z− direction with the assumption that the surface of the display 110 is placed on the 2-dimensional x-y plane.

However, this is merely an example. The sensor 120 may include a piezo film which outputs an electric signal corresponding to a magnitude of pressure applied by the pressing input. In this case, the controller 130 may determine the location of the concave local area or the convex local area using coordinate values of a point at which an electric signal corresponding to the greatest pressure is out and coordinate values of a point at which an electric signal corresponding to pressure greater than a predetermined level is output. On the other hand, the controller 130 may calculate a difference between a value of the electric signal corresponding to the greatest pressure and a value of an electric signal corresponding to the smallest pressure in the location of the concave local area or the convex local area. Accordingly, the controller 130 may calculate the height information of the concave local area or the convex local area which is formed by the pressing input applied by the user.

The controller 130 may determine whether the local area is a concave shape or a convex shape using the bend sensor, the acceleration sensor, the gyro sensor, or the geomagnetic sensor. For example, using the two overlapping bend sensors as shown in FIG. 6, the controller 130 may determine the bending direction according to a difference of a change in the resistance value of the each bend sensor. When the bending direction is the Z+ direction, the local area is determined to be the convex shape. When the bending direction is the Z− direction, the local area is determined to be the concave shape.

Hereinafter, the first exemplary embodiment will be explained in detail using a detailed configuration of the display 110 and a method for sensing thereof.

The controller 130 controls an overall operation of the flexible display apparatus 100. In particular, the controller 130 may control all or some of the display 110 and the sensor 120.

In particular, the controller 130 may determine shape deformation of the display 110 based on a result of sensing by the sensor 120. In particular, the controller 130 may determine whether the display 110 is bent or not, a location of a bending area, a size of the bending area, a number of bending areas, a size of a bending line, a location of the bending line, a number of bending lines, a bending direction, a bending angle, and a number of times that bending occurs. This has been described above with reference to FIGS. 3 to 7. Thus, a detailed description is omitted.

The controller 130 may determine whether an area formed by a pressing input of the user is a concave shape or a convex shape. Also, the controller 130 may determine a location of the concave local area or the convex local area of the display 110 which is formed by the pressing input of the user. Also, the controller 130 may calculate height information of the concave local area or the convex local area of the display 110 which is formed by the pressing input of the user. This has been described above. Thus, a detailed explanation is omitted.

The controller 130 may control the display 110 to change a display state according to the shape deformation. Specifically, the controller 130 may control the display 110 to reconfigure an object displayed on the screen of the display 110 according to the deformed shape, and display the object.

The controller 130 may control the display 110 to reconfigure the object displayed on the concave area or convex area which is formed by the pressing input of the user, and display the object.

In particular, the controller 130 may reconfigure the object by scaling the object displayed on the concave area or the convex area considering the calculated height information, or changing pixels of the object displayed on the concave area or the convex area considering the calculated height information. The scaling the object refers to zooming in or zooming out the object by magnifying or reducing the pixels of the object. In the case of scaling, image quality of the zoomed-in object may deteriorate in comparison with original image quality.

The changing the pixels refers to vector graphic processing. The object may be zoomed in or zoomed out through the vector graphic processing. In the case of vector graphic processing, there is no difference between image quality of the zoomed-in object and original image quality.

In other words, the object displayed on the concave area or the convex area may be zoomed in or zoomed by scaling or changing of the pixels.

The scaling of the displayed object or the changing the pixels of the displayed object may be performed considering the calculated height information. In other words, the controller 130 may zoom in or zoom out the object displayed on the concave area or the convex area using a zoom-in or zoom-out ratio corresponding to the calculated height information. For example, when the calculated height information has a great value (i.e., when the pressing input of the user is great and the top of the concave area or the convex area is high), the controller 130 zooms in or zooms out the object displayed on the concave area or convex area using a high zoom-in ratio or a high zoom-out ratio. When the calculated height information has a small value (i.e., when the pressing input of the user is small and the top of the concave area or the convex area is low), the controller 130 zooms in or zooms out the object displayed on the concave area or convex area using a low zoom-in ratio or a low zoom-out ratio.

Also, the object displayed on the concave or convex area may be zoomed in or zoomed out only when the pressing input of the user is held. In this case, when the height information is changed according to a change in the pressing input force of the user, the zoom-in or zoom-out ratio of the object displayed on the convex area or the concave area may be changed.

However, this should not be considered as limiting. The object displayed on the concave or convex area may be held in the zoom-in state or zoom-out state according to a setting state of the flexible display apparatus 100 even when the pressing input of the user is canceled. In this case, when an input to reset the object to the original display state is received, the object may be reset to the original display state before it is zoomed in or zoomed out.

The zooming in or zooming out of the object displayed on the concave area or convex area will be explained in detail with reference to FIG. 9.

The display 110 may display a screen as shown in view (a) of FIG. 9. In this state, when a concave area is formed by a pressing input of the user as shown in view (b) of FIG. 9, the controller 130 may control the display 110 to zoom out an object displayed on the concave area, and display the object. Also, when a convex area is formed by a pressing input of the user as shown in view (c) of FIG. 9, the controller 130 may control the display 110 to zoom in an object displayed on the convex area and display it.

However, this should not be considered as limiting. The controller 130 may control the display 110 to zoom in the object displayed on the concave area and display the object, and to zoom out the object displayed on the convex area and display the object.

The controller 130 may reconfigure the object by displaying the object displayed on the concave area and upper menus on the object displayed on the concave area, considering the calculated height information. The upper menus on the object may be displayed in a descending order, in sequence.

A number of layers of the upper menus on the object displayed on the concave area may be changed considering the calculated height information. In other words, when the calculated height information has a great value (i.e., when the pressing input of the user is great and the top of the concave area is high), a large number of layers of the upper menus may be displayed. Further, when the calculated height information has a small value (i.e., when the pressing input of the user is small and the top of the concave area is low), a small number of layers of the upper menus may be displayed.

Hereinafter, a case in which the object displayed on the concave area formed by the pressing input of the user is a 'specific application icon' will be explained by an example.

The controller 130 may control the display 110 to move an application icon, which is displayed on the concave area formed by the pressing input of the user, to a specific area (e.g., a center), and to display menus 'Delete App', 'Setting Option', and 'Run Now', which are 1 layer upper menus, on an area a little higher than the concave area. Also, the controller 130 may control the display 110 to display menus 'Lock Device' and 'Display Lock Screen', which are 2 layer upper menus, on an area higher than the 1 layer upper menu. Also, the controller 130 may control the display 110 to display menus 'Off Device' and 'Reset', which are 3 layer upper menus, on an area higher than the 1 layer upper menus. Accordingly, the user can easily find the menus and run them.

Also, the controller 130 may reconfigure the object by displaying the object displayed on the convex area and lower menus on the object displayed on the convex area, considering the calculated height information. The lower menus on the object may be displayed in an ascending order, in sequence.

A number of layers of the lower menus on the object displayed on the convex area may be changed considering the calculated height information. In other words, when the calculated height information has a great value (i.e., when the pressing input of the user is great and the top of the convex area is high), a large number of layers of the lower menus may be displayed. Further, when the calculated height information has a small value (i.e., when the pressing input of the user is small and the top of the convex area is low), a small number of layers of the lower menus may be displayed.

Hereinafter, a case in which an object displayed on a second area deformed by a pressing input of the user is a 'telephone application icon' will be explained by an example.

The controller 130 may control the display 110 to move the application icon, which is displayed on the second area formed by the pressing input of the user, to a specific area (e.g., a center), and to display menus 'Favorites', 'Recent Call', 'Contact Info.', and 'Keypad', which are 1 layer lower menus, on an area a little lower than the convex area. Also, the controller 130 may control the display 110 to display a menu 'Configuration of Keypad', which is a 2 layer lower menu, on an area lower than the 1 layer lower menus. Also, the controller 130 may control the display 110 to display a menu 'All Contact Info.', which is a 3 layer lower menu, on an area lower than the 2 layer lower menu.

However, the operation of moving the application icon to a specific area may be omitted according to settings of the flexible display apparatus 100. Also, the upper/lower menus on each application are not limited to the above-described menus. Also, although different menu layers may be displayed at different heights in the above example, this should not be considered as limiting. Only the object may be displayed on the concave area or convex area, and the upper or lower menus may be displayed on a flat area around the object. Also, the object displayed on the concave or convex area formed by the pressing input of the user is not displayed and only the upper or lower menus thereof may be displayed. Also, the upper or lower menus may be displayed in the form of a text or an icon.

Also, the upper or lower menus may be arranged in a different form according to the shape of the concave or convex area. In other words, when the concave or convex area is formed in a circular shape, the upper or lower menus are arranged in a circular form. Further, when the concave or convex area is formed in a quadrangular shape, the upper or lower menus may be arranged in a quadrangular form.

The upper or lower menus may be displayed only when the pressing input of the user is held. In this case, when the height information is changed according to a change in the pressing input force of the user, the layers of the displayed upper or lower menus may be changed.

However, this should not be considered as limiting. The display of the upper or lower menus may be held according to a setting state of the flexible display apparatus 100 even when the pressing input of the user is canceled. In this case, when an input to reset the display state to the original display state is received, the upper or lower menus may be removed.

The displaying the lower menus on the object displayed on the convex area will be explained in detail with reference to FIG. 10.

As shown in view (a) of FIG. 10, the user may perform a pressing input to a specific photo content of a screen on which a plurality of photo contents are displayed. In this case, the controller 130 may control the display 110 to display menus 'Send with Message', 'Cut', 'Delete', 'Send to SNS', which are 1 layer lower menus, on an area a little lower than the convex area, as shown in view (b) of FIG. 10. Also, the controller 130 may control the display 110 to display a menu related to the menu 'Send to SNS', which is a 2 layer lower menu, on an area lower than the 1 layer lower menu, as shown in view (b) of FIG. 10.

Also, the controller 130 may reconfigure the object by displaying detailed information on the object displayed on the concave or convex area, considering the calculated height information.

An amount of detailed information may be changed considering the calculated height information. In other words, when the calculated height information has a great value (i.e., when the pressing input of the user is great and the top of the concave area or convex area is high), much detailed information may be displayed. When the calculated height information has a small value (i.e., when the pressing input of the user is small and the top of the concave area or the convex area is low), less detailed information may be displayed.

The detailed information may be displayed on the concave area or convex area which is deformed by the pressing input of the user. The detailed information may be displayed on the entire screen. In other words, when there is a need to display the detailed information on the entire screen according to a characteristic of the object, the detailed information may be displayed on the entire screen. When there is a need to display the detailed information on some areas of the screen, the detailed information may be displayed on the deformed area.

The detailed information may be displayed only when the pressing input of the user is held. In this case, when the height information is changed according to a change in the pressing input force of the user, an amount of displayed detailed information may be changed.

However, this should not be considered as limiting. The display of the detailed information may be held according to a setting state of the flexible display apparatus 100 even when the pressing input of the user is canceled. In this case, when an input to reset the display state to the original display state is received, the detailed information may be removed.

The displaying the detailed information will be explained in detail with reference to FIGS. 11 and 12.

The user may perform a pressing input to a specific movie content of a screen on which a plurality of movie contents are displayed as shown in view (a) of FIG. 11. In this case, the controller 130 may control the display 110 to display detailed information of the selected movie content, 'Genre: Comedy', 'Produced In: Korea', 'Main Character: Mr. Kim', 'Running Time: 90 min.', on the entire screen. Accordingly, the user can easily know the detailed information on the object.

The user may perform a pressing input to a specific area of a screen on which a map is displayed as shown in view (a) of FIG. 12. In this case, the controller 130 may control the display 110 to display point of information (POI), which is detailed information on the selected area, on a convex area as shown in view (b) of FIG. 12. The POI may be displayed along with a magnifying glass icon as shown in view (b) of FIG. 12.

According to the first exemplary embodiment as described above, by changing the display state of the display 110 according to the pressing input of the user, shape deformation characteristic of the flexible display apparatus can be variously utilized.

<#2: Second Exemplary Embodiment>

Figure 13:
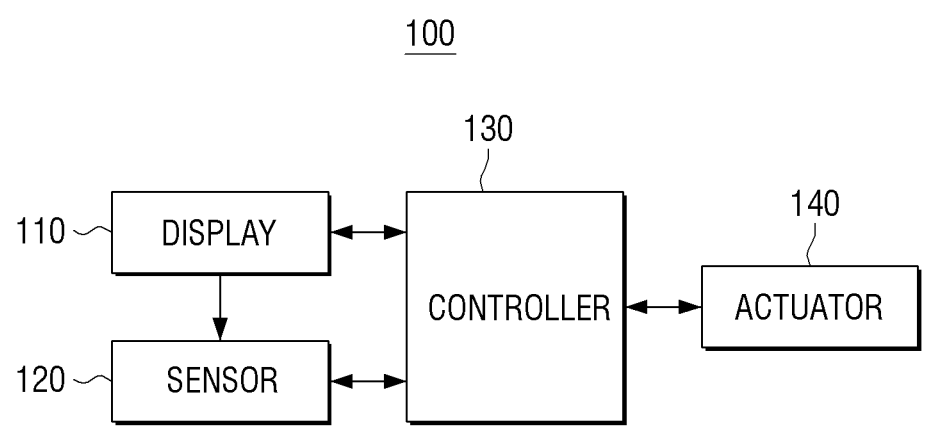
FIG. 13 is a block diagram illustrating a flexible display apparatus according to a second exemplary embodiment.

FIG. 13 is a block diagram illustrating a configuration of a flexible display apparatus according to a second exemplary embodiment. Referring to FIG. 13, the flexible display apparatus 100 includes all or some of a display 110, a sensor 120, a controller 130, and an actuator 140. The second exemplary embodiment differs from the first exemplary embodiment in that the flexible display apparatus 100 includes the actuator 140. Therefore, in explaining the flexible display apparatus 100 according to the second exemplary embodiment, the different feature that the actuator 140 is included will be explained.

The actuator 140 provides shape deformation to the display 110. In particular, under the control of the controller 130, the actuator 140 may provide the display 110 with a force to deform a local area of the display 110 into a convex shape in the Z+ direction or deform a local area into a concave shape in the Z− direction. The actuator 140 may be implemented using an electro active polymer (EAP), a piezoelectric element, a shape memory alloy (SMA), a thermal fluid pocket, a micro-electro-mechanical system (MEMS) element, a MEMS pump, and a resonant device.

The EAP may have its shape changed in response to an applied voltage. The EAP may be formed using at least one of electrostrictive polymers, dielectric elastomers (DEs), conducting polymers, ionic polymer metal composites (IP-MCs), responsive gels, and bucky gel.

When the original shape is deformed, the SMA which recovers its original shape according to ambient temperature and/or ambient environment may be comprised of an alloy of copper-zinc-aluminum, copper-aluminum-nickel, nickel-titanium, or a combination of alloys of copper-zinc-aluminum, copper-aluminum-nickel, and/or nickel-titanium.

Hereinafter, an operation of the actuator 140 will be explained in detail with reference to FIGS. 14 to 20.

Figure 14:
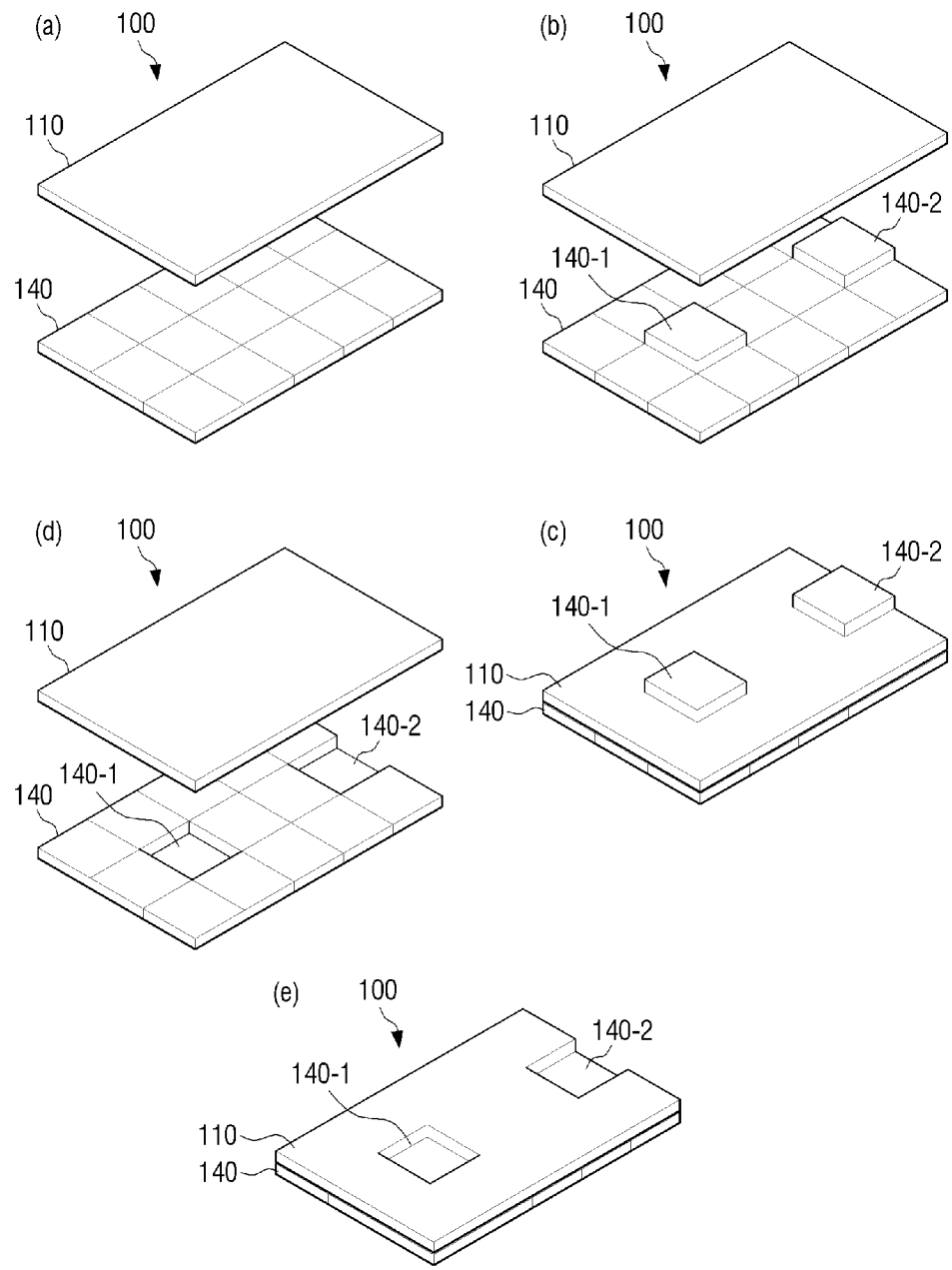

View (a) of FIG. 14 illustrates the actuator 140 which is not operated. The actuator 140 may be divided into a plurality of areas.

Views (b) and (d) of FIG. 14 illustrate the actuator 140 which is operated by the controller 130. In other words, the controller 130 controls at least one of a level of a voltage applied to each of the plurality of areas and an applying order, thereby controlling an operation of each of the plurality of areas of the actuator 140. Referring to view (b) of FIG. 14, local areas 140-1 and 140-2 of the actuator 140 may be operated and deformed into a convex shape. Also, referring to view (d) of FIG. 14, the local areas 140-1 and 140-2 of the actuator 140 may be operated and deformed into a concave shape.

Views (c) and (e) of FIG. 14 illustrate the display 110 which is deformed by shape deformation of the actuator 140. Referring to view (c) of FIG. 14, local areas 140-1 and 140-2 of the display 110 may be deformed into the convex shape by the shape deformation of the actuator 140. Also, as shown in view (e) of FIG. 14, the local areas 140-1 and 140-2 of the display 110 may be deformed into the concave shape by the shape deformation of the actuator 140.

However, FIG. 14 is merely an example, and the deformed shape of the actuator 140 and the number of divided areas may be different from those of FIG. 14. When the number of divided areas increases, the deformed shape of the display 110 may be similar to a semi-circular shape.

Although the actuator 140 is disposed under the display 110, this should not be considered as limiting. The actuator 140 may be disposed between the protection layer 114 and the display panel 113, between the display panel 113 and the driver 112, between the driver 112 and the substrate 111, or under the substrate 111.

Figure 15:
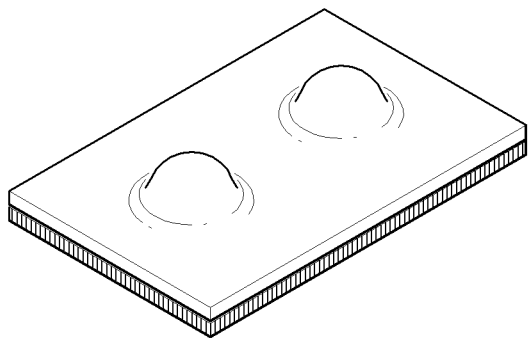

FIG. 15 is a view illustrating a shape of the display 110 which is deformed when the number of divided areas of the actuator 114 increases. Referring to FIG. 15, the shape of the display 110 deformed by the shape deformation of the actuator 140 is similar to a semi-circular shape.

FIGS. 16 and 17 are cross section views to illustrate an operation of the actuator 140. View (a) of FIG. 16 and view (a) of FIG. 17 illustrate the actuator 140 which is not operated. The controller 130 controls at least one of a level of a voltage applied to each of the plurality of areas and an applying order. Thus, controlling an operation of each area of the actuator 140 is shown in view (b) of FIG. 16 and view (b) of FIG. 17. Accordingly, the display 110 may be deformed into the convex shape as shown in view (b) of FIG. 16. Also, the display 110 may be deformed into the concave shape under the control of the controller 130 as shown in view (b) of FIG. 17.

FIG. 18 is a view illustrating an actuator 140 which is implemented using a piezoelectric element according to an exemplary embodiment. Referring to view (a) of FIG. 18, the actuator 140 may be implemented using piezoelectric elements 141 which are formed in a plurality of areas. When a voltage is applied to the piezoelectric element 141 as shown in view (b) of FIG. 18, the shape of the piezoelectric element 141 to which the voltage is applied may be deformed. Accordingly, the display 110 may be deformed into the convex shape as shown in view (b) of FIG. 18. The deformed shape of the piezoelectric element 141 may vary according to a level of the applied voltage.

Although not shown in FIG. 18, the piezoelectric element 141 may be contracted according to the applied voltage. In this case, the display 110 may be deformed into the concave shape.

FIG. 19 is a view illustrating an actuator 140 which is implemented using a fluid filling cell including a thermal fluid pocket according to an exemplary embodiment. Referring to view (a) of FIG. 19, the actuator 140 may be implemented using fluid filling cells 141 which are formed in a plurality of areas. The fluid filling cell 141 may include a thermal fluid pocket 141-1 and an activation cell 141-2.

The thermal fluid pocket 141-1 may include a fluid having physical characteristics of low specific heat and high thermal expansion. The fluid may be glycerin or ethyl alcohol.

The activation cell 141-2 serves as a heater to heat the thermal fluid pocket 141-1, and may use various electric, optical, and mechanical technologies related to heating technology. For example, various registers which are electrically controlled may be used in the activation cell 141-2. Also, an optical stimulator such as infrared ray laser may be used as the activation cell 141-2 to heat the thermal fluid pocket 141-1. Also, a rear-mounted heat stimulator, which is similar to a hot plasma display found in a flat panel plasma TV, may be used as the activation cell 141-2 to heat the thermal fluid pocket 141-1.

When the activation cell 141-2 emits heat, the thermal fluid pocket 141-1 may have its physical shape expanded by the heat emitted from the activation cell 141-2. Accordingly, the thermal fluid pocket to which the heat is applied by the activation cell 141-2 may expand as shown in view (b) of FIG. 19. Accordingly, the display 110 may be deformed into the convex shape as shown in view (b) of FIG. 19. The deformed shape of the piezoelectric element 141 may vary according to an amount of applied heat.

Although not shown in FIG. 19, the fluid filling cell 141 may have an active cooling system. Accordingly, the thermal fluid pocket 141-1 may be contracted. In this case, the display 110 may be deformed into the concave shape.

Figure 20:
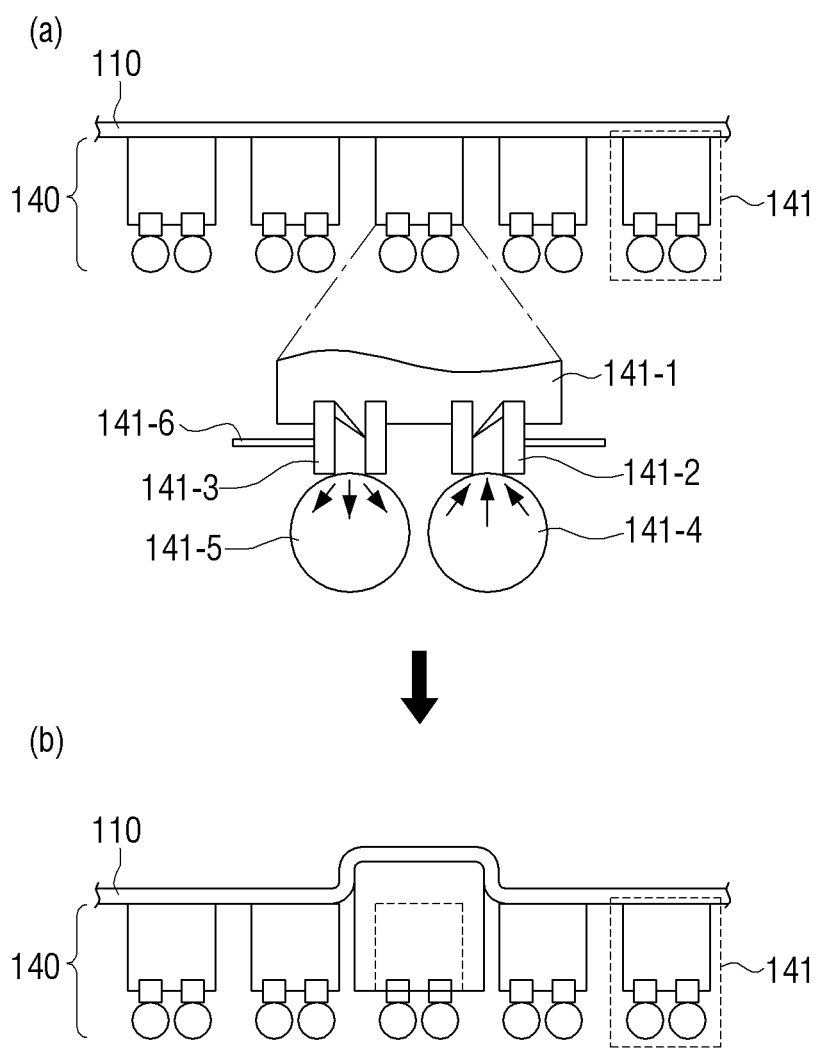

FIG. 20 is a view illustrating an actuator which is implemented by using an MEMS pump according to an exemplary embodiment. Referring to view (a) of FIG. 20, the actuator 140 may be implemented using MEMS pumps 141 which are formed in a plurality of areas. The MEMS pump 141 may include a pocket 141-1, a pressure valve 141-2, a pressure reducing valve 141-3, an injection tube 141-4, a discharge tube 141-5, and a control line 141-6.

The injection tube 141-4 may be used to pump liquid or gas through the pressure valve 141-2 and expand the pocket 141-2. Also, the discharge tube 141-5 may be used to discharge liquid or gas through the pressure reducing valve 141-3 and discharge pressure from the pocket 141-1. The pressure valve 141-2 and the pressure reducing valve 141-3 are opened and closed under the control of the control line 141-6.

When the pressure valve 141-2 is opened, the pocket 141-1 may be expanded as shown in view (b) of FIG. 20. Accordingly, the display 110 may be deformed into the convex shape as shown in view (b) of FIG. 20. The deformed shape of the pocket 141-1 may vary according to an amount of flowing-in liquid or gas.

Also, although not shown in FIG. 20, the pocket 141-1 may be contracted according to an amount of discharged liquid or gas. In this case, the display 110 may be deformed into the concave shape.

However, the above-described configurations of the actuator 140 are merely examples for convenience, and should not be considered as limiting. Accordingly, the actuator 140 may use various methods for deforming the shape of the flexible display apparatus 100.

Hereinafter, the detailed configuration of the display 110, the sensing method thereof, and the operation of the actuator 140 according to the second exemplary embodiment will be explained in detail.

The controller 130 may control all or some of the display 110, the sensor 120, and the actuator 140.

In particular, the controller 130 may determine deformation information for reconfiguring an object displayed on the screen of the display 110, and displaying the object. The deformation information may be height information for providing shape deformation to the display 110.

The height information may be mapped onto an image corresponding to a screen displayed on the display 110. In other words, the image corresponding to the screen displayed on the display 110 (the image recited herein refers to a concept that encompasses a moving image screen and a text screen, and may include an object therein) may include height information. When the image has a JPEG format, the height information may be included in a header area, and which area includes the height information may depend on the format of the image.

The height information may be information that is set by an input of the user.

Also, the height information may refer to a height value of a convex local area in the Z+ direction or a height value of a concave local area in the Z− direction with the assumption that the surface of the display 110 is placed on the 2-dimensional x-y plane.

Accordingly, when an object displayed on the screen is selected in various methods, the controller 130 may determine height information for reconfiguring the selected object, and displaying the object. Also, the controller 130 may control the actuator 140 to deform a local area of the display 110 into a concave shape or a convex shape using the determined height information. This will be explained in detail with reference to FIGS. 21 to 24.

FIG. 21 is a view illustrating shape deformation which is performed by automatically detecting an object displayed on the screen.

The controller 130 may detect at least one object from the displayed screen using codebook, which is one of various object detecting methods. The codebook refers to a representative set of local feature descriptors that is configured to effectively represent local feature descriptors. The above-described codebook may be obtained by performing a clustering process such as k-means clustering with respect to many local feature descriptors. Specifically explaining the codebook-based object detecting method, the controller 130 may detect local feature descriptors from an image including at least one object using histograms of oriented gradients (HOG) or scalar invariant feature transform (SIFT). A detector (not shown) applies the detected local feature descriptors to the codebook using hard vector-quantization, sparse coding (SC), local coordinate coding (LCC), or locality-constrained linear coding (LLC). As a result of applying the detected local feature descriptors to the codebook, a code vector is generated. The controller 130 may generate the generated code vector as a single vector having the same dimension as that of the codebook. The controller 130 may recognize and detect the at least one object using the generated single vector.

In other words, when a screen including an object is displayed as shown in view (a) of FIG. 21, the controller 130 may detect an area where the object is displayed as shown in view (b) of FIG. 21. When height information mapped onto the detected object is the Z– direction, the controller 130 may control the actuator 140 to deform the area where the detected object is displayed into a concave shape. When height information mapped onto the detected object is the Z+ direction, the controller 130 may control the actuator 140 to deform the area where the detected object is displayed into a convex shape. The height of the concave or convex area may vary according to the height information mapped onto the object.

However, this should not be considered as limiting. The controller 130 may control the actuator 140 to deform the area where the detected object is displayed into the convex or concave shape using height information which is input by the user.

Figure 22:
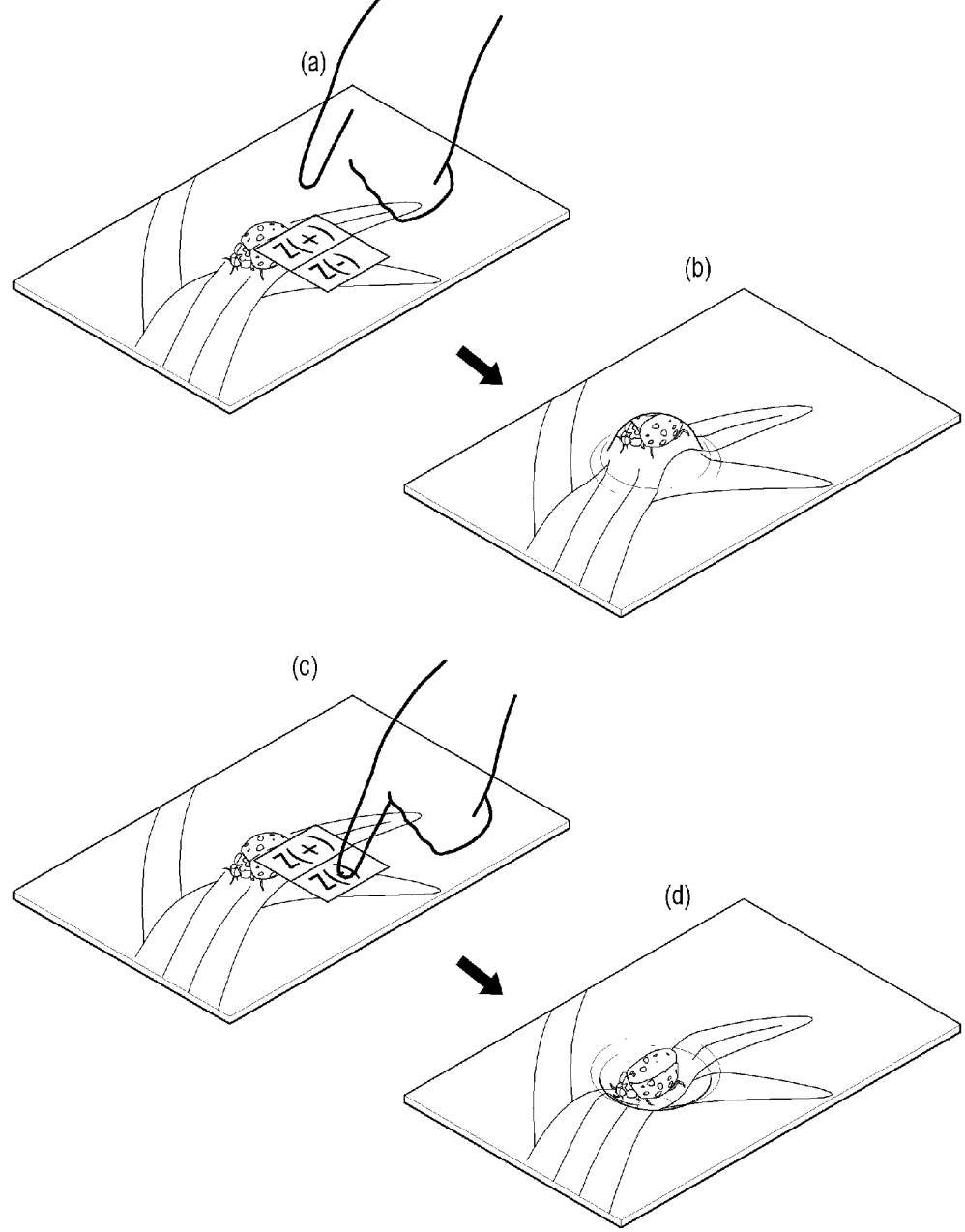

FIG. 22 is a view illustrating shape deformation which is performed by selecting an object displayed on the screen by a touch input of the user.

Referring to views (a) and (c) of FIG. 22, when a touch input of the user is sensed, the display 110 may display a UI window to receive selection on whether the sensed area is deformed into a concave shape (Z–) or a convex shape (Z+). When the user selects the Z–, the controller 130 may control the actuator 140 to deform the selected area into the concave shape as shown in view (d) of FIG. 22. When the user selects the Z+, the controller 130 may control the actuator 140 to deform the selected area into the convex shape as shown in view (b) of FIG. 22. The height of the concave or convex area may be a predetermined height. Also, when the user touches in the Z– direction or Z+ direction for a long time, the top of the concave area or the convex area becomes higher.

However, this should not be considered as limiting. When the user selects the concave (Z–) or the convex (Z+), the controller 130 may control the actuator 140 to deform the selected area into the concave or convex shape using the height information mapped onto the selected area.

Figure 23:
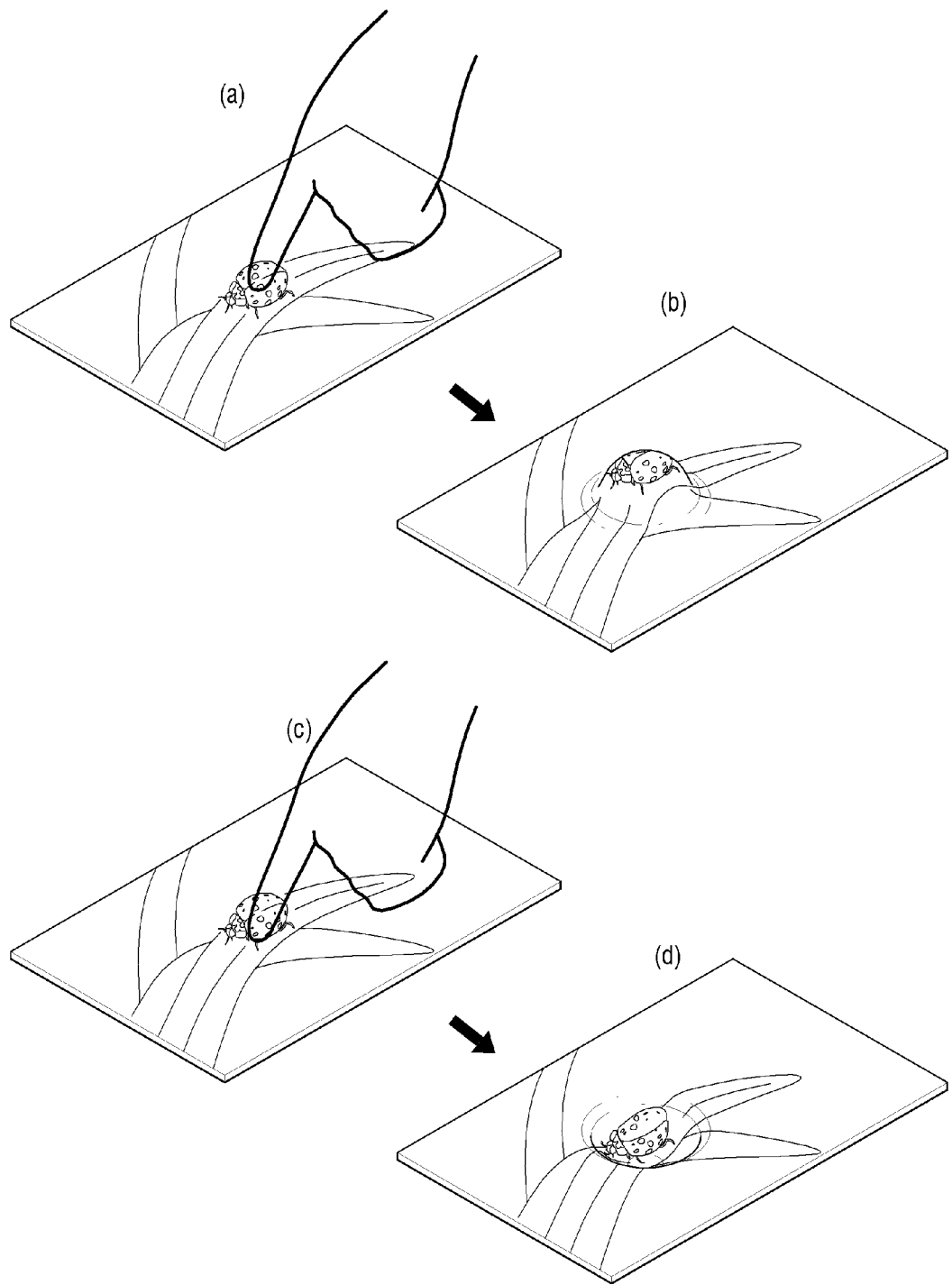

FIG. 23 is a view illustrating shape deformation which is performed by selecting an object displayed on the screen by a touch input of the user.

Referring to views (a) and (c) of FIG. 23, when a specific area is selected by a touch input of the user, the controller 130 may control the actuator 140 to deform the selected area into a concave shape or deform the selected area into a convex shape using height information mapped onto the selected area. In other words, when the height information mapped onto the selected area is the Z– direction, the controller 130 may control the actuator 140 to deform the selected area into the concave shape. When the height information mapped onto the selected area is the Z+ direction, the controller 130 may control the actuator 140 to deform the selected area into the convex shape. The height of the concave or convex area may vary according to the height information mapped onto the object.

However, this should not be considered as limiting. The controller 130 may control the actuator 140 to deform the area where the selected object is displayed into the convex or concave shape using height information which is set according to a condition of the touch input of the user. The condition of the touch input may include various conditions such as an intensity of touch and a touch input time. For convenience, it is assumed that the condition of the touch input is a touch input time.

In other words, when the user touches the selected area for 1 hour, the controller 130 deforms the selected area into the concave shape. When the user touches the selected area for 2 hours longer than 1 hour, the controller 130 deforms the selected area into a more concave shape. When the user touches the selected area for 3 hours, the controller 130 deforms the selected area into the convex shape. When the user touches the selected area for 4 hours longer than 3 hours, the controller 130 deforms the selected area a more convex shape.

Figure 24:
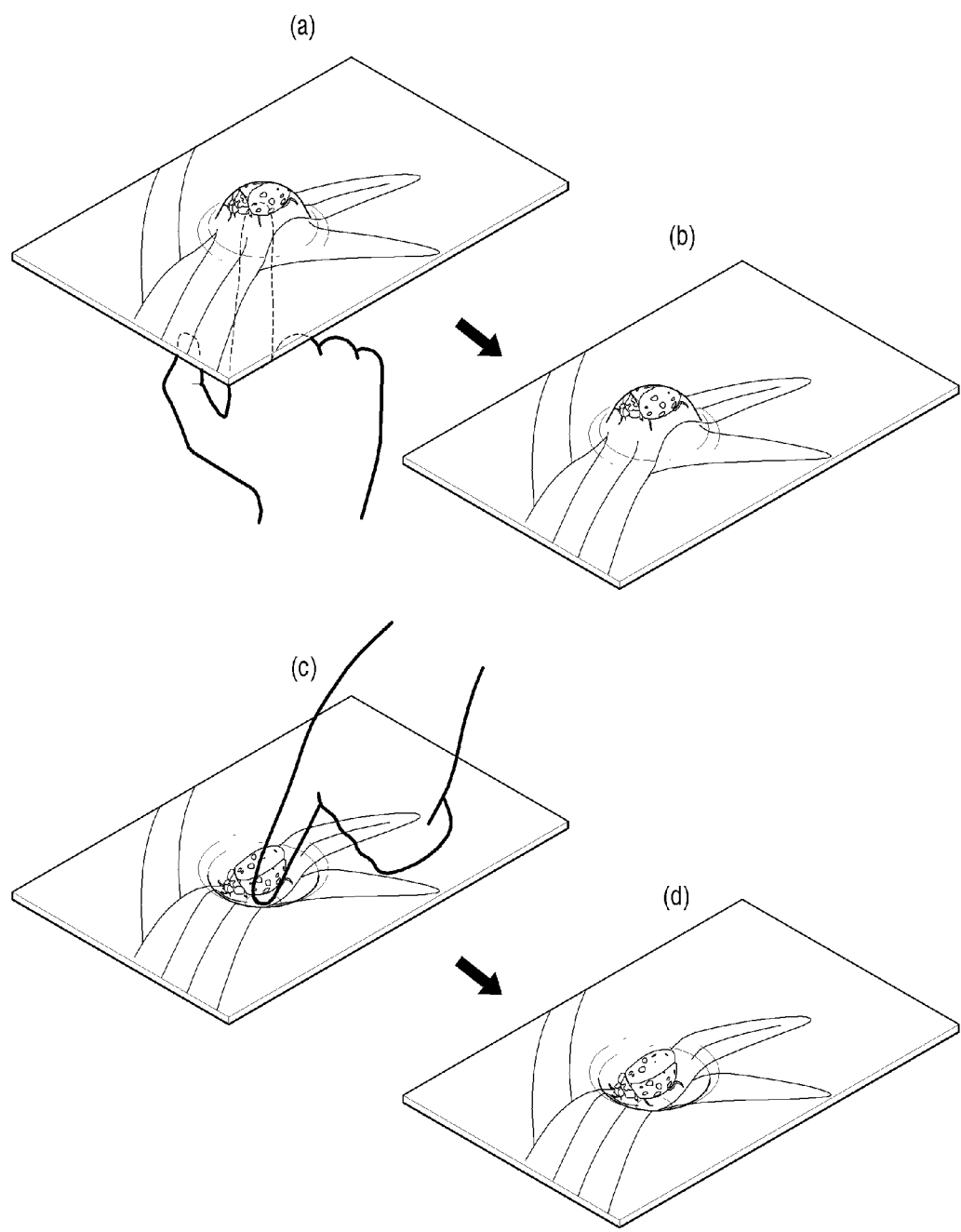

FIG. 24 is a view illustrating shape deformation which is performed by selecting an object displayed on the screen by a pressing input of the user.

Referring to views (a) and (c) of FIG. 24, when a specific area is selected by a pressing input of the user, the controller 130 may control the actuator 140 to deform the selected area into a concave shape or deform the selected area into a convex shape using height information mapped onto the selected area. When the height information mapped onto the selected area is the Z– direction, the controller 130 may control the actuator 140 to deform the selected area into the concave shape. When the height information mapped onto the selected area is the Z+ direction, the controller 130 may control the actuator 140 to deform the selected area into the convex shape. The height of the concave or convex area may vary according to the height information mapped onto the object.

However, this should not be considered as limiting. The controller 130 may control the actuator 140 to deform the area where the selected object is displayed into the convex shape or concave shape using height information which is set according to the pressing input of the user.

In other words, when the user presses the display 110 with more than a predetermined force, the area which is subject to the pressing force may be deformed into the concave or convex shape due to the flexibility of the flexible display apparatus. In other words, when the user presses the display 110 from Z– to Z+ with reference to the surface of the display 110 as shown in view (a) of FIG. 24, the pressed area is deformed into the convex shape. When the user presses the display 110 from Z+ to Z− with reference to the surface of the display 110 as shown in view (c) of FIG. 24, the pressed area is deformed into the concave shape.

In this case, the controller 130 may determine height information corresponding to the pressing input of the user as height information for deforming the shape of the display 110. In this case, since the height information corresponding to the pressing input of the user is used as height information for deforming the shape of the display 110, the controller 130 may control the actuator 140 to hold the shape deformation caused by the pressing input of the user.

Also, the controller 130 may move the concave area or convex area when a specific user manipulation is performed. Specifically, when the concave area or convex area is formed and an area other than the concave area or convex area is selected in the method described above in FIGS. 21 to 24, the selected area may be deformed into a concave shape or convex shape. Also, when the user touches the concave area or convex area and drags to a specific location while still touching, the controller 130 may form a concave or convex area on the specific location where a touch point is formed by the dragging. In this case, when the new concave or convex area is formed, the existing concave or convex area may be removed or held according to setting of the user or a setting state of the user terminal apparatus 100. Hereinafter, this will be explained in detail with reference to FIG. 25.

Figure 25:
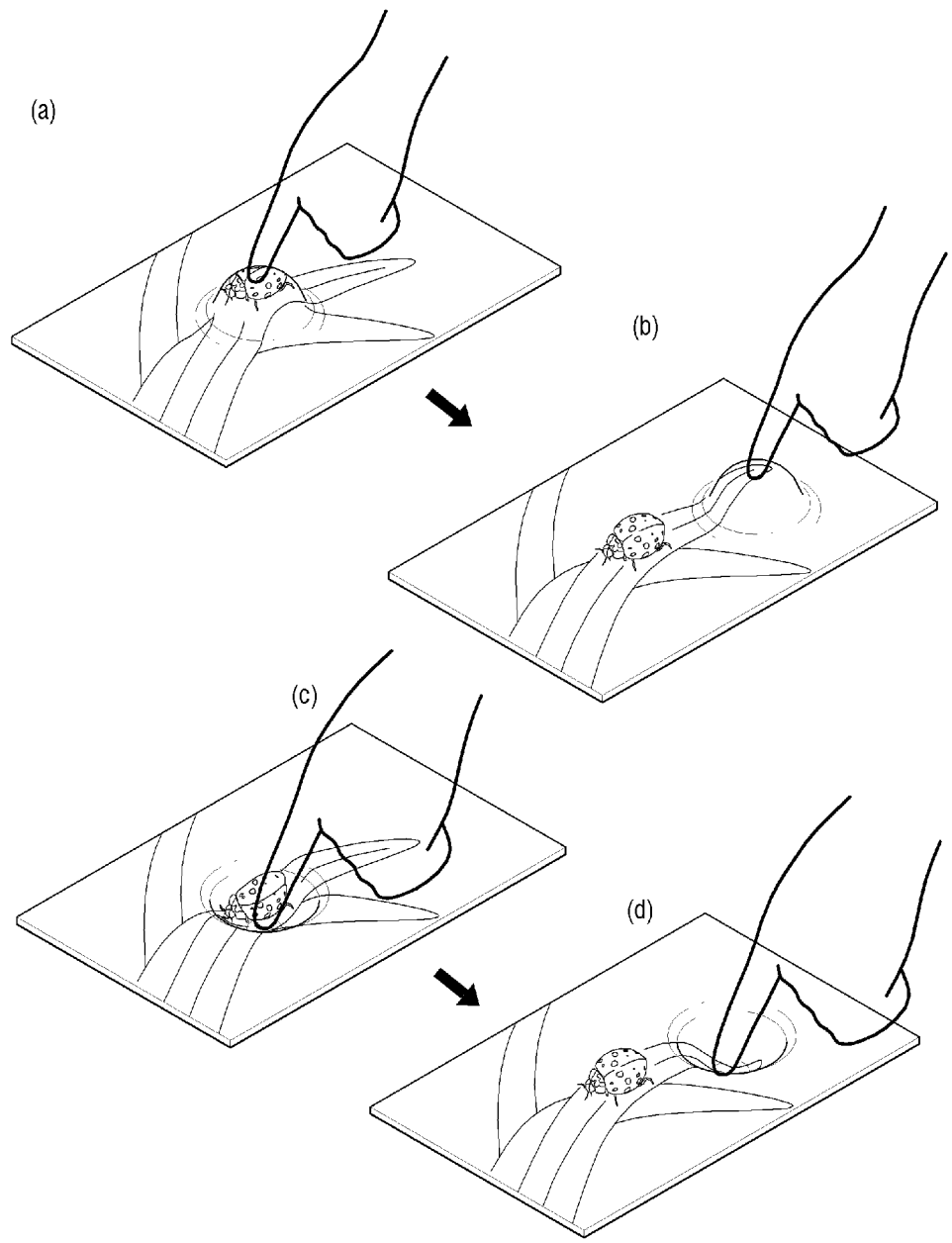

When the user touches the convex area and drags to a specific location while still touching as shown in view (a) of FIG. 25, a convex area is formed on the specific location where a touch point is formed by the dragging as shown in view (b) of FIG. 25. Also, when the user touches the concave area and drags to a specific location while still touching as shown in view (c) of FIG. 25, a concave area is formed on the specific location where a touch point is formed by the dragging as shown in view (d) of FIG. 25.

The controller 130 may control the display 110 to display a UI window for controlling the formed concave or convex area. The UI window for controlling the formed concave or convex area may be displayed by a user manipulation of touching or pressing the formed concave or convex area. Also, the UI window for controlling the formed concave or convex area may include menus 'Zoom In Further or Zoom Out Further', 'Reset', 'Zoom In or Zoom Out'. The menus 'Zoom In Further' and 'Zoom Out' may be provided when the convex area is formed, and the menus 'Zoom Out Further' and 'Zoom In' may be provided when the concave area is formed. When the menu 'Zoom In Further' is selected, the controller may control the actuator 140 to provide a force to make the convex area more convex. However, this should not be considered as limiting. This method may be applied in the inverse case according to a setting state of the user terminal apparatus 100. When the menu 'Zoom Out Further' is selected, the controller 130 may control the actuator 140 to provide a force to make the convex area less convex. The above-described UI window will be explained in detail with reference to FIG. 26.

When the user touches a convex area as shown in view (a) of FIG. 26, a UI window including menus 'Zoom In Further', 'Reset', and 'Zoom Out' may be displayed. In this case, when the user selects the menu 'Reset' as shown in view (b) of FIG. 26, the controller 130 may control the actuator 120 to restore the flexible display apparatus 100 to the original state as shown in view (c) of FIG. 26. In this case, the convex area may be removed.

On the other hand, when the shape of the display 110 is deformed by the above-described operation, the controller 130 may control the following operations.

In particular, the controller 130 may control the display 110 to reconfigure an object displayed on a concave area or a convex area and display the object.

In other words, the controller 130 may reconfigure the object by scaling the object displayed on a first or second area considering height information, or changing pixels of the object displayed on the first or second area considering calculated height information. This has been described above with reference to FIG. 9. Thus, a detailed description is omitted.

Also, the controller 130 may reconfigure the object by displaying the object displayed on the first area and an upper menu on the object displayed on the first area, considering height information.

Also, the controller 130 may reconfigure the object by displaying the object displayed on the second area and a lower menu on the object displayed on the second area, considering calculated height information. This has been described above with reference to FIG. 10. Thus, a detailed description is omitted.

Also, the controller 130 may reconfigure the object by displaying detailed information on the object displayed on the first or second area, considering calculated height information. This has been described above with reference to FIG. 11. Thus, a detailed description is omitted.

On the other hand, according to the second exemplary embodiment as described above, the actuator provides shape deformation to the display 110, so that the shape deformation characteristics of the flexible display apparatus can be utilized variously by changing the display state of the display 110.

Figure 27:
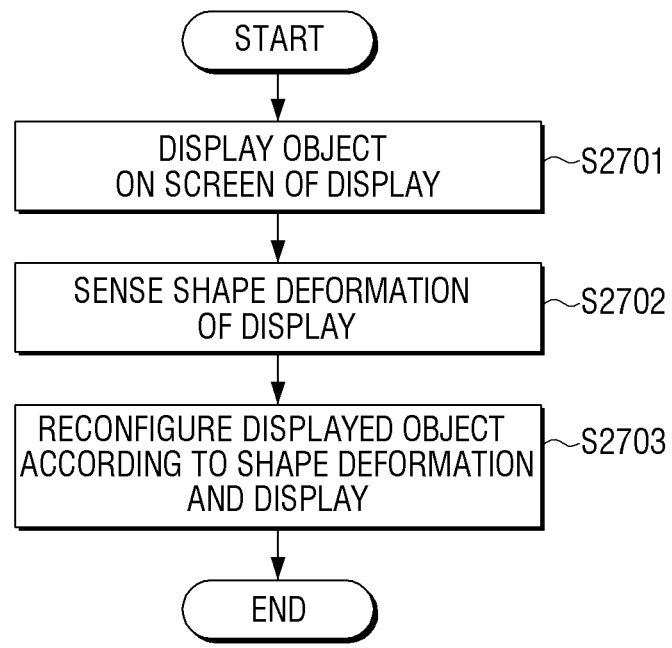
FIG. 27 is a flowchart illustrating a control method of a flexible display apparatus according to the first exemplary embodiment.

FIG. 27 is a flowchart illustrating a control method of a flexible display apparatus according to the first exemplary embodiment. Referring to FIG. 27, an object is displayed on the screen of the display (S2701).

Shape deformation of the display is sensed (S2702). In the operation of sensing (S2702), a first area which corresponds to an area where the display is deformed into a concave shape or a second area which corresponds to an area where the display is deformed into a convex shape may be sensed.

The displayed object is reconfigured according to the deformed shape and displayed (S2703). In the operation of reconfiguring and displaying (S2703), the object displayed on the first area or the second area may be reconfigured and displayed.

The control method of the flexible display apparatus according to the first exemplary embodiment may further include calculating height information of the sensed first area or second area.

In this case, the operation of reconfiguring and displaying (S2703) may reconfigure and display the object by scaling the object displayed on the first or second area considering the calculated height information, or changing pixels of the object displayed on the first or second area considering the calculated height information.

The operation of reconfiguring and displaying (S2703) may reconfigure and display the object by displaying the object displayed on the first area and an upper menu on the object displayed on the first area, considering the calculated height information.

The operation of reconfiguring and displaying (S2703) may reconfigure and display the object by displaying the object displayed on the second area and a lower menu on the object displayed on the second area, considering the calculated height information.

The operation of reconfiguring and displaying (S2703) may reconfigure and display the object by displaying detailed information on the object displayed on the first or second area, considering the calculated height information.

Figure 28:
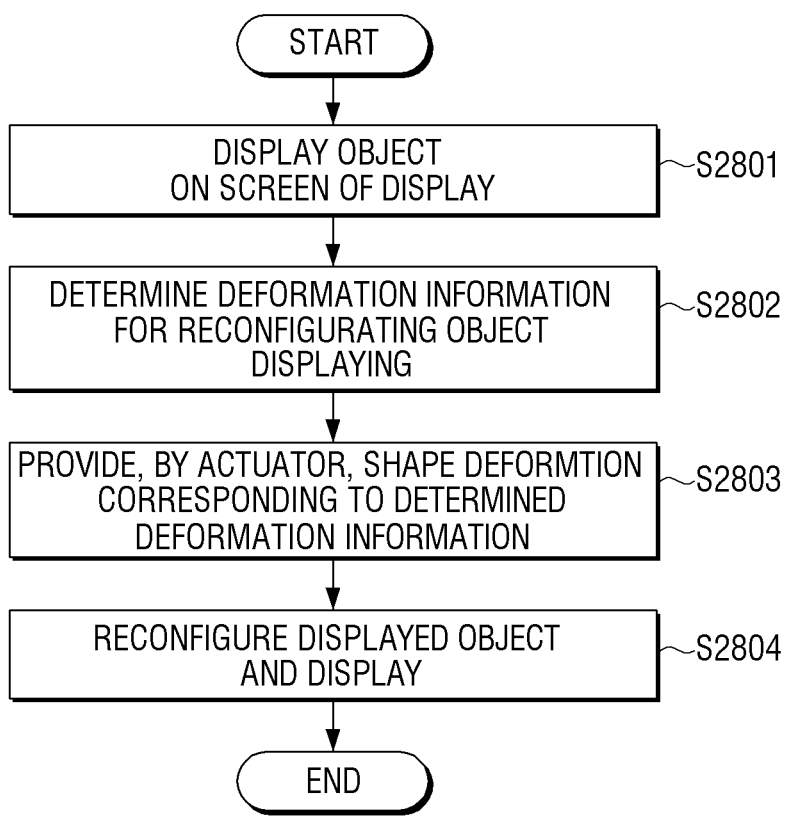
FIG. 28 is a flowchart illustrating a control method of a flexible display apparatus according to the second exemplary embodiment.

FIG. 28 is a flowchart illustrating a control method of a flexible display apparatus according to the second exemplary embodiment. Referring to FIG. 28, an object is displayed on the screen of the display (S2801).

Deformation information for reconfiguring and displaying the object is determined (S2802). The deformation information may be height information for providing shape deformation to the display.

The actuator to provide shape deformation to the display provides shape deformation corresponding to the determined deformation information (S2803). The operation of providing (S2803) may provide shape deformation for making a first area of the display concave or making a second area convex using height information.

The displayed object is reconfigured and displayed (S2804). The operation of reconfiguring and displaying (S2804) may reconfigure and display the object displayed on the first or second area.

The control method of the flexible display apparatus according to the second exemplary embodiment may further include automatically detecting the object from the screen. In this case, the operation of providing (S2803) may provide the shape deformation using height information which is mapped onto the detected object.

The control method of the flexible display apparatus according to the second exemplary embodiment may further include sensing a touch input of the user to the display. In this case, the operation of providing (S2803) may provide the shape deformation using height information which is mapped onto the object selected by the touch input.

The control method of the flexible display apparatus according to the second exemplary embodiment may further include sensing shape deformation of the display which is caused by a pressing input of the user. When the shape of the display is deformed by the sensed pressing input, providing, by the actuator, shape deformation to hold the deformed shape.

The operation of reconfiguring and displaying (S2804) may reconfigure and display the object by scaling the object displayed on the first or second area considering the height information, or changing pixels of the object displayed on the first or second area considering the height information.

The operation of reconfiguring and displaying (S2804) may reconfigure and display the object by displaying the object displayed on the first area and an upper menu on the object displayed on the first area, considering the height information.

The operation of reconfiguring and displaying (S2804) may reconfigure and display the object by displaying the object displayed on the second area and a lower menu on the object displayed on the second area, considering the calculated height information.

The operation of reconfiguring and displaying (S2804) may reconfigure and display the object by displaying detailed information on the object displayed on the first or second area, considering the calculated height information.

Figure 29:
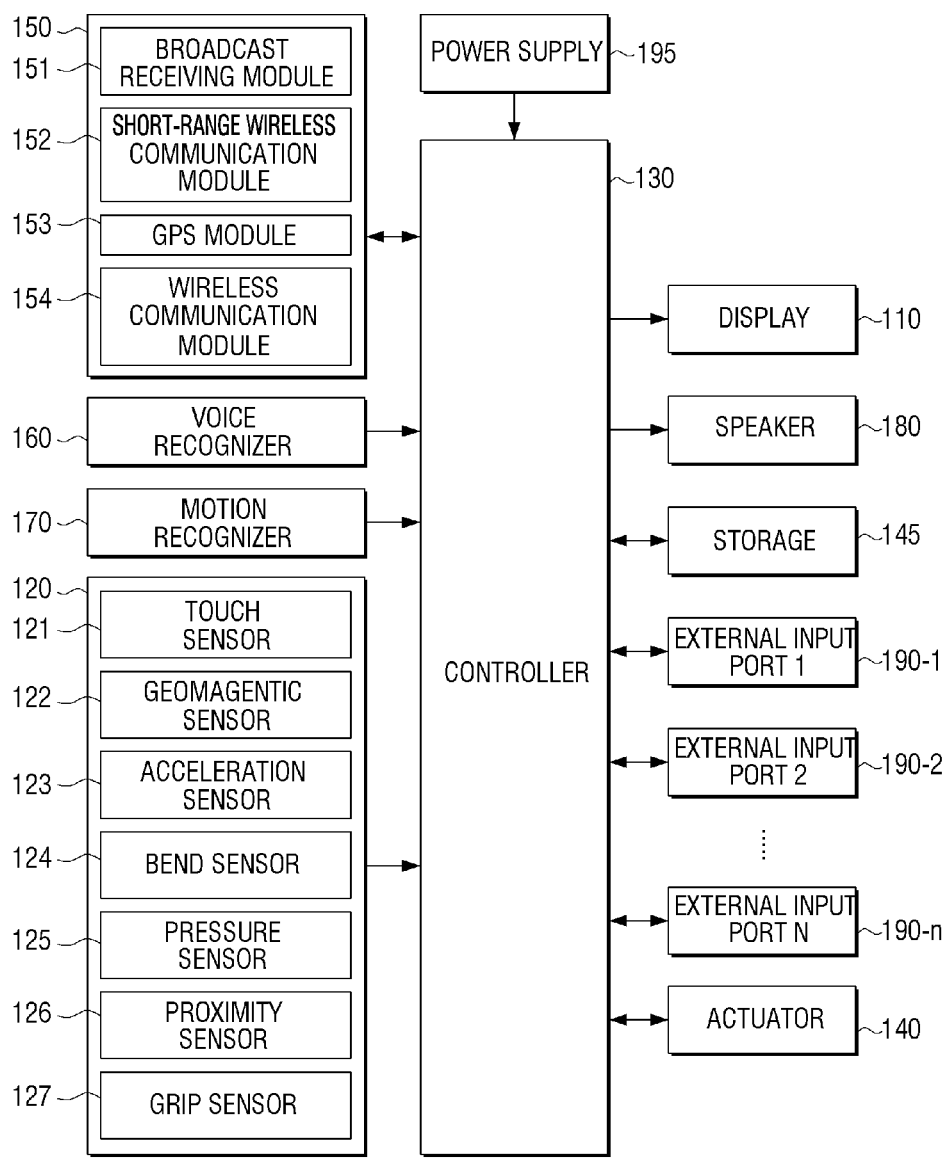
FIG. 29 is a block diagram illustrating a detailed configuration of a flexible display apparatus according to various exemplary embodiments.

FIG. 29 is a block diagram to illustrate a detailed configuration of a flexible display apparatus to explain operations according to various exemplary embodiments. Referring to FIG. 29, a flexible display apparatus 100 includes all or some of a display 110, a sensor 120, a controller 130, an actuator 140, a storage 145, a communicator 150, a voice recognizer 160, a motion recognizer 170, a speaker 180, external input ports 190-1~190-$n$, and a power supply 500. The flexible display apparatus 100 according to the first exemplary embodiment may not include the actuator 140.

The display 110 has flexibility. The detailed configuration and operation of the display have been described above. Thus, a redundant explanation is omitted.

The storage 145 may store various programs or data associated with the operation of the flexible display apparatus 100, setting information set by the user, system operating software, various application programs, and information on operations corresponding to a user manipulation.

The sensor 120 senses a bending manipulation and a touch manipulation on the entire flexible display apparatus 100 including the display 110. Referring to FIG. 29, the sensor 120 may include various kinds of sensors such as a touch sensor 121, a geomagnetic sensor 122, an acceleration sensor 123, a bend sensor 124, a pressure sensor 125, a proximity sensor 126, and a grip sensor 127, etc.

The touch sensor 121 may be implemented using a capacitive type or a resistive type of sensor. The capacitive type calculates touch coordinates by sensing minute electricity excited in a user body when a part of the user body touches the surface of the display 110, using a dielectric substance coated on the surface of the display 110. The resistive type includes two electrode plates. When a user touches a screen, touch coordinates are calculated by sensing an electric current flowing due to contact between upper and lower plates at the touched point. As described above, the touch sensor 121 may be embodied in various forms.

The geomagnetic sensor 122 senses a rotation state and a moving direction of the flexible display apparatus 100. The acceleration sensor 123 senses a degree of tilt of the flexible display apparatus 100. As described above, the geomagnetic sensor 122 and the acceleration sensor 123 may be used to sense bending characteristics such as a bending direction or a bending area of the flexible display apparatus 100. However, the geomagnetic sensor 122 and the acceleration sensor 123 may be used to sense a rotation state or a tilt state of the flexible display apparatus 100.

The bend sensor 124 may be embodied in various shapes and numbers as described above, and may sense a bending state of the flexible display apparatus 100. The configuration and operation of the bend sensor 124 have been described above and thus a redundant explanation is omitted.

The pressure sensor 125 senses a magnitude of pressure exerted to the flexible display apparatus 100 when the user performs a touch or bending manipulation, and provides the magnitude of pressure to the controller 130. The pressure sensor 125 may include a piezo film which is embedded in the display 110 and outputs an electric signal corresponding to the magnitude of pressure. Although the pressure sensor 125 is a separate element from the touch sensor 121 in FIG. 29, when the touch sensor 121 is implemented using a resistive touch sensor, the resistive touch sensor may also perform the function of the pressure sensor 125.

The proximity sensor 126 senses a motion which approaches without directly contacting the display surface. The proximity sensor 126 may be implemented using various types of sensors, such as a high-frequency oscillation type proximity sensor, which forms a high frequency magnetic field and detects an electric current induced by a magnetic characteristic which is changed when an object approaches, a magnetic type proximity sensor which uses a magnet, and a capacitive type proximity sensor which detects capacitance that changes when an object approaches, etc.

The grip sensor 127 is disposed on a border or a handle of the flexible display apparatus 100 separately from the pressure sensor 125, and senses a user grip. The grip sensor 127 may be implemented by using a pressure sensor or a touch sensor.

The controller 130 analyzes various sensing signals sensed by the sensor 120, obtains a user intention, and performs an operation according to the user intention. For example, the controller 130 may process data which is obtained by communicating with an external apparatus, or data which is stored in the storage 145, and may output the data through the display 110 and the speaker 180. In this case, the controller 130 may communicate with the external apparatus using the communicator 150.

The communicator 150 may communicate with various types of external apparatuses according to various communication methods. The communicator 150 may include various communication modules such as a broadcast receiving module 151, a short-range wireless communication module 152, a GPS module 153, and a wireless communication module 154. The broadcast receiving module 151 may include a terrestrial broadcast receiving module (not shown) including an antenna to receive a terrestrial broadcast signal, a demodulator, and an equalizer, and a digital multimedia broadcasting (DMB) module to receive and process a DMB broadcast signal. The short-range wireless communication module 152 is a module that communicates with an external apparatus located nearby according to a short-range wireless communication method such as near field communication (NFC), Bluetooth, or Zigbee, etc. The GPS module 153 is a module that receives a GPS signal from a GPS satellite and detects a current location of the flexible display apparatus 100. The wireless communication module 154 is a module that is connected to an external network according to a wireless communication protocol, such as Wi-Fi or IEEE, etc., and communicates with the external network. The wireless communication module 154 may further include a mobile communication module that accesses a mobile communication network and performs communication according to various mobile communication standards such as $3^{rd}$ generation (3G), $3^{rd}$ generation partnership project (3GPP), and long term evolution (LTE).

The controller 130 may selectively activate the elements of the communicator 150 that are necessary for performing the operation according to the user intention, and may perform the operation.

The controller 130 may recognize voice input or motion input besides the bending or touch manipulation, and may perform an operation corresponding to the input. In this case, the controller 130 may activate the voice recognizer 160 or the motion recognizer 170.

The voice recognizer 160 collects a user voice or an external sound using a voice obtaining means such as a microphone (not shown), and transmits the user voice or the external sound to the controller 130. When the user voice is consistent with a pre-set voice command in a voice control mode, the controller 130 may perform a task corresponding to the user voice. The task, which is controllable using a voice, may include various tasks such as adjusting a volume, selecting a channel, zapping (e.g., changing) a channel, adjusting a display property, reproducing, pausing, rewinding, fast forwarding, executing an application, selecting a menu, turning on an apparatus, and turning off an apparatus.

The motion recognizer 170 obtains a user image using an image picking up means (not shown) such as a camera, and provides the user image to the controller 130. When the controller 130 analyzes the user image and determines that the user makes a motion gesture corresponding to a pre-set motion command in a motion control mode, the controller 130 performs an operation corresponding to the motion gesture. For example, various tasks such as zapping a channel, turning on an apparatus, turning off, pausing, reproducing, stopping, rewinding, fast forwarding, mute, etc., may be controlled according to a motion. The above-described tasks that are controllable according to a voice and the tasks that are controllable according to a motion are merely examples, and are not limited.

The external input ports 1, 2, . . . , n 190-1~190-*n* may be connected to various types of external apparatuses and may receive various data or programs or control commands. Specifically, the external input ports may include USB ports, headset ports, mouse ports, and LAN ports, etc.

The power supply 500 supplies power to the elements of the flexible display apparatus 100.

Although FIG. 29 illustrates various elements which may be included in the flexible display apparatus 100, the flexible display apparatus 100 may not necessarily include all of the elements, and may not include only the above elements. Therefore, some of the elements may be omitted or added according to a product type of the flexible display apparatus 100, or may be replaced with other elements.

Figure 30:
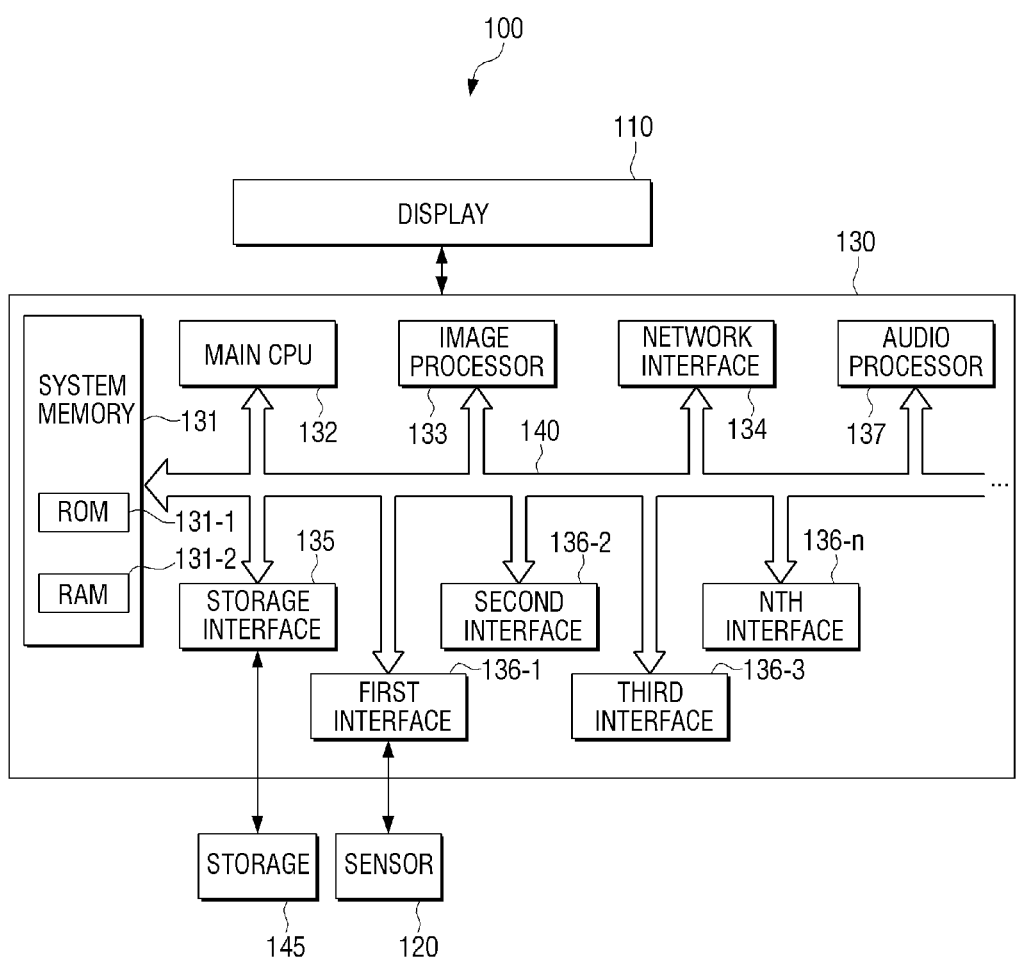
FIG. 30 is a block diagram illustrating a detailed configuration of a controller.

FIG. 30 is a view to illustrate a detailed configuration of the controller 130 according to various exemplary embodiments.

Referring to FIG. 30, the controller 130 may include a system memory 131, a main CPU 132, an image processor 133, a network interface 134, a storage interface 135, first to nth interfaces 136-1 to 136-*n*, an audio processor 137, and a system bus 138.

The system memory 131, the main CPU 132, the image processor 133, the network interface 134, the storage interface 135, the first to nth interfaces 136-1 to 136-*n*, and the audio processor 137 may be connected to one another through the system bus 138, and may exchange various data or signals with one another.

The first to nth interfaces 136-1 to 136-*n* support interfacing between the elements including the sensor 120 and the elements of the controller 130. In FIG. 30, the sensor 120 is connected to only the first interface 136-1. However, when the sensor 120 includes various types of sensors as shown in FIG. 30, each of the sensors may be connected through each interface. Also, at least one of the first to nth interfaces 136-1 to 136-*n* may be implemented by using a button which is provided on a body of the flexible display apparatus 100, or an input interface which receives various signals from an external apparatus which is connected through the external input ports 1 to n.

The system memory 131 includes a read only memory (ROM) 131-1 and a random access memory (RAM) 131-2. The ROM 131-1 stores a set of commands for system booting. When a turn on command is input and power is supplied, the main CPU 132 copies an OS which is stored in the storage 140 into the RAM 131-2 according to a command stored in the ROM 131-1, executes the OS, and boots the system. When booting is completed, the main CPU 132 copies various applications stored in the storage 140 into the RAM 131-2, executes the applications copied into the RAM 131-2, and performs various operations.

As described above, the main CPU 132 may perform various operations according to execution of the application stored in the storage 145.

The storage interface 135 is connected to the storage 145 and exchanges various programs, content, and data etc. with the storage 145.

For example, when the user performs a touch manipulation or a bending manipulation corresponding to a reproducing command to reproduce and display a content stored in the storage 145, the main CPU 132 accesses the storage 145 through the storage interface 135, generates a list of stored contents, and displays the list on the display 110. In this state, when the user performs a touch manipulation or a bending manipulation to select one content, the main CPU 132 executes a content reproducing program which is stored in the storage 145. The main CPU 132 controls the image processor 133 to form a content reproducing screen according to a command included in the content reproducing program.

The image processor 133 may include a decoder, a renderer, a scaler, etc. Accordingly, the image processor 133 decodes a stored content, renders the decoded content data and forms a frame, and scales a size of the frame according to a screen size of the display 110. The image processor 133 provides the processed frame to the display 110 and displays the processed frame.

The audio processor 137 refers to an element that processes audio data and provides the audio data to a sound outputting means such as a speaker 180. The audio processor 137 performs audio signal processing by decoding audio data which is stored in the storage 145 or audio data which is received through the communicator 150, filtering noise, and amplifying the audio data to an appropriate decibel. In the above example, when the content to be reproduced is a moving image content, the audio processor 137 may process the audio data which is de-multiplexed from the moving image content, and may provide the audio data to the speaker 180 so that the audio data is synchronized with the image processor 133 and is output.

The network interface 134 is connected to external apparatuses through a network. For example, when a web browser program is executed, the main CPU 132 accesses a web server through the network interface 134. When web page data is received from the web server, the main CPU 132 controls the image processor 133 to form a web page screen, and displays the web page screen on the display 110.

Figure 31:
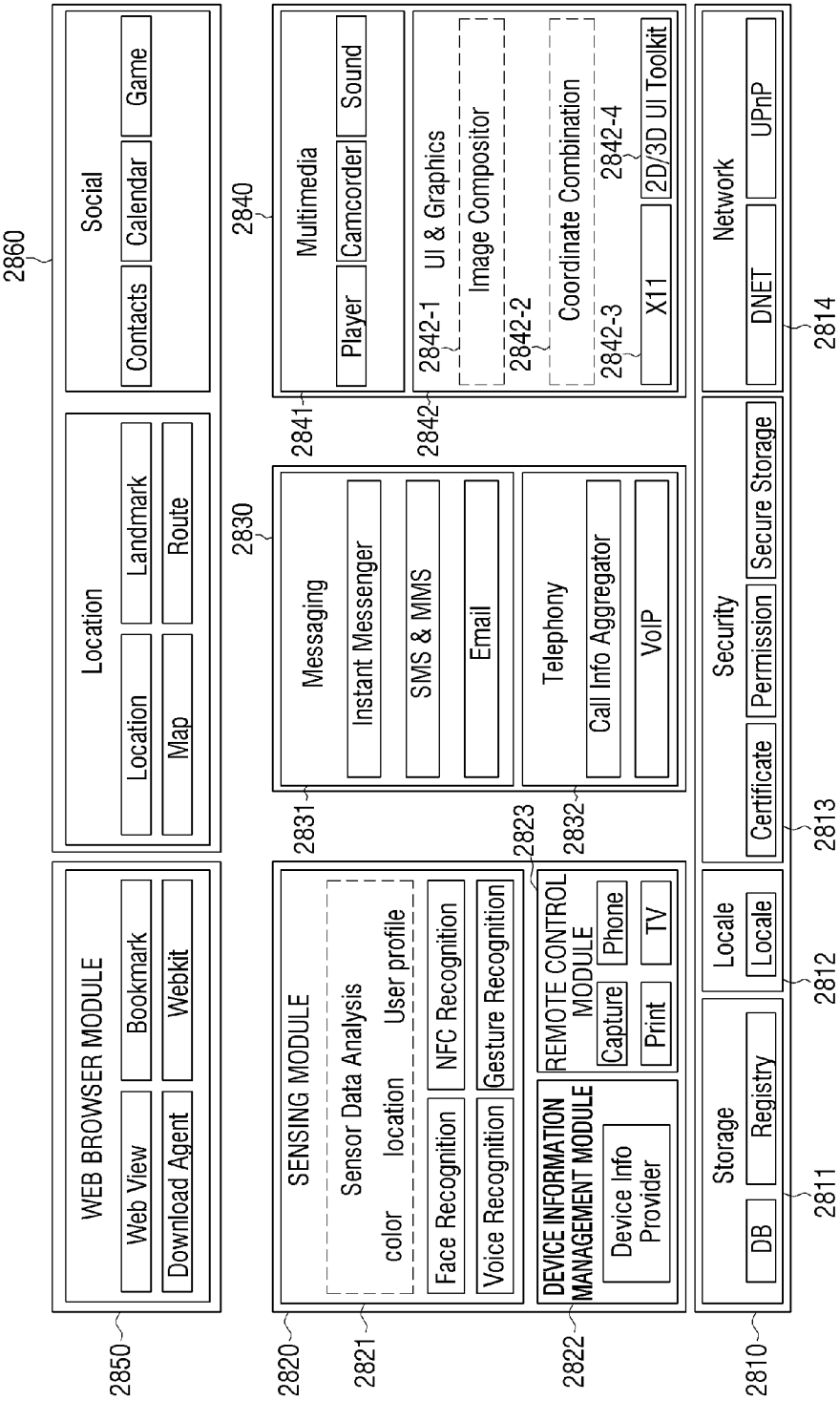
FIG. 31 is a view illustrating an example of a software structure stored in a storage.

FIG. 31 is a view illustrating a software structure of the storage 145 to support the operations of the controller 130 according to the above-described various exemplary embodiments. Referring to FIG. 31, the storage 145 includes a base module 2810, a device management module 2820, a communication module 2830, a presentation module 2840, a web browser module 2850, and a service module 2860.

The base module 2810 is a module that processes signals transmitted from each hardware element that is included in the flexible display apparatus 100, and transmits the signals to an upper layer module.

The base module 2810 includes a storage module 2811, a location-based module 2812, a security module 2813, and a network module 2814.

The storage module 2811 is a program module that manages a database (DB) or a registry. The location-based module 2812 is a program module that is interlocked with hardware such as a GPS chip and supports a location-based service. The security module 2813 is a program module that supports certification for hardware, permission of a request, and a secure storage, and the network module 2814 includes a Distributed.net (DNET) module and a Universal Plug and Play (UPnP) module as a module for supporting network connection.

The device management module 2820 is a module that manages external input and information on an external device, and uses the same. The device management module 2820 may include a sensing module 2821, a device information management module 2822, and a remote control module 2823, etc.

The sensing module 2821 is a module that analyzes sensor data provided from various sensors of the sensor 120. In particular, the sensing module 2821 is a program module that detects a location of a user or an object, color, shape, size, and other profiles, etc. The sensing module 2821 may include a face recognition module, a voice recognition module, a motion recognition module, and an NFC recognition module. The device information management module 2822 is a module that provides information on various types of devices, and the remote control module 2823 is a program module that remotely controls a peripheral device such as a telephone, a television (TV), a printer, a camera, and an air conditioner, etc.

The communication module 2830 is a module to communicate with an external apparatus. The communication module 2830 includes a messaging module 2831 such as a messenger program, a short message service (SMS) and multimedia message service (MMS) program, and an email program, etc., and a telephony module 2832 which includes a call information aggregator program module and a voice over internet protocol (VoIP) module.

The presentation module 2840 is a module that generates a display screen. The presentation module 2840 includes a multimedia module 2841 to reproduce multimedia content and output the multimedia content, and a user interface (UI) and graphic module 2842 to process a UI and graphics. The multimedia module 2841 may include a player module, a camcorder module, and a sound processing module. Accordingly, the multimedia module 2841 generates a screen and a sound by reproducing various multimedia contents, and reproduces the same. The UI and graphic module 2842 may include an image compositor module 2842-1 to combine images, a coordinate combination module 2842-2 to combine coordinates on a screen to display an image and generate coordinates, an X11 module 2842-3 to receive various events from hardware, and a 2D/3D UI toolkit 2842-4 to provide a tool for configuring a UI of a 2D or 3D format.

The web browser module 2850 is a module that performs web-browsing and accesses a web server. The web browser module 2850 may include a web view module to render and view a web page, a download agent module to download, a bookmark module, and a web-kit module, etc.

The service module 2860 is an application module that provides various services. Specifically, the service module 2860 may include various modules such as a navigation service module to provide a map, a current location, a landmark, and route information, a game module, and an advertisement application module.

The main CPU 132 of the controller 130 accesses the storage 145 through the storage interface 135, copies various modules stored in the storage 145 into the RAM 131-2, and performs operations according to operations of the copied modules.

Specifically, the main CPU 132 analyzes output values of the sensors of the sensor 120 using the sensing module 2821, checks a bending area, a bending line, a bending direction, a number of times that bending is performed, a bending angle, a bending speed, a touch area, a number of times that touch is performed, an intensity of touch, a magnitude of pressure, a degree of proximity, and an intensity of user's grip, and, based on a result of the checking, determines whether a user bending gesture is a predetermined gesture or not. When it is determined that the user bending gesture is the predetermined gesture, the main CPU 132 detects information on an operation corresponding to the user manipulation from the database of the storage module 2810. The main CPU 132 drives a module corresponding to the detected information and performs an operation.

For example, when the operation is displaying a graphic user interface (GUI), the main CPU 132 configures a GUI screen using the image compositor module 2842-1 of the presentation module 2840. Also, the main CPU 132 determines a display location of the GUI screen using the coordinate combination module 2842-2 and controls the display 110 to display the GUI screen on the location.

When a user manipulation corresponding to a message receiving operation is performed, the main CPU 132 executes the messaging module 2841, accesses a massage management server, and receives a message stored in a user account. Also, the main CPU 132 configures a screen corresponding to the received message using the presentation module 2840 and displays the screen on the display 110.

When a telephone call is performed, the main CPU 132 may drive the telephony module 2832.

As described above, programs of various structures may be stored in the storage 145 and the controller 130 may perform various operations using various programs stored in the storage 145.

FIG. 32 is a view illustrating a flexible display apparatus which is implemented as a tablet PC according to various exemplary embodiments. Referring to FIG. 32, in a state in which the screen is displayed on the tablet PC as shown in view (a) of FIG. 32, the tablet PC may zoom out of an object displayed on a specific area and may display the object on a specific concave area as shown in view (b) of FIG. 32.

FIG. 33 is a view illustrating a flexible display apparatus which is implemented as a kiosk according to various exemplary embodiments. The kiosk refers to an information transferring apparatus of a touch screen method which is installed in public places. Referring to FIG. 33, in a state in which the screen is displayed on the kiosk as shown in view (a) of FIG. 33, the kiosk may deform a specific area into a convex shape and may display POI, which is detailed information on the specific area, on the specific convex area as shown in view (b) of FIG. 33. In this case, the POI may be displayed along with a magnifying glass icon as shown in view (b) of FIG. 33.

Figure 34:
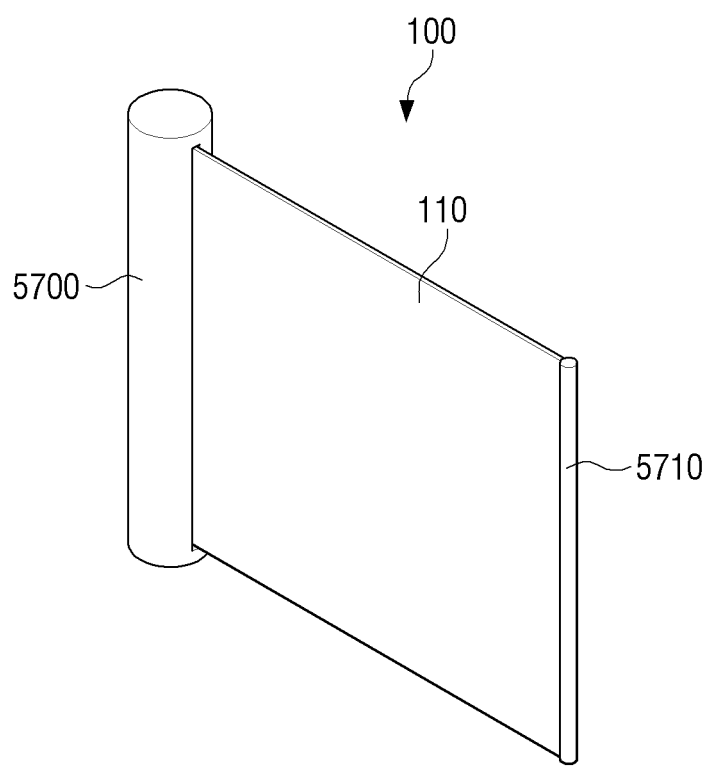
FIG. 34 is a view illustrating an example of a flexible display apparatus which is embedded in a body.

FIG. 34 is a view illustrating an example of a flexible display apparatus which is embedded in a body. Referring to FIG. 34, the flexible display apparatus 100 includes a body 5700, a display 110, and a grip part 5710.

The body 5700 may serve as a kind of a case containing the display 110. When the flexible display apparatus 100 includes various elements as shown in FIG. 29, elements other than the display 110 and some sensors may be mounted in the body 5700. The body 5700 includes a rotary roller for rolling the display 110. Accordingly, when not in use, the display 110 is rolled about the rotary roller and embedded in the body 5700.

When the user holds the grip part 5710 and pulls the display 110, the rotary roller is rotated in the opposite direction to that of the rolling and rolling is released, so that the display 110 comes out to the outside of the body 5700.

A stopper may be provided on the rotary roller. Accordingly, when the user pulls the grip part 5710 by more than a predetermined distance, the rotation of the rotary roller is stopped by the stopper and the display 110 may be fixed. Accordingly, the user can execute various functions using the display 110 that is outside of the body 5700. When the user presses a button to release the stopper, the stopper is released and the rotary roller is rotated in a reverse direction. As a result, the display 110 is rolled in the body 5100. The stopper may have a switch shape to stop an operation of a gear to rotate the rotary roller. Since the rotary roller and the stopper may employ a general rolling structure as it is, detailed illustration and explanation thereof are omitted.

The body 5700 includes a power supply 500. The power supply 500 may be implemented by using a battery connector on which a disposable battery is mounted, a secondary cell which can be charged and used multiple times by the user, and a solar cell which generates electricity using solar heat. When the power supply is implemented by using the secondary cell, the user may connect the body 5700 to an external power source through a wire and may charge the power supply 500.

In FIG. 34, the body 5700 has a cylindrical shape. However, the shape of the body 5700 may be quadrangular or other polygonal shape. Also, the display 110 may be implemented in various forms such as enclosing the body 5700, rather than being embedded in the body 5700 and being exposed to the outside by being pulled.

Figure 35:
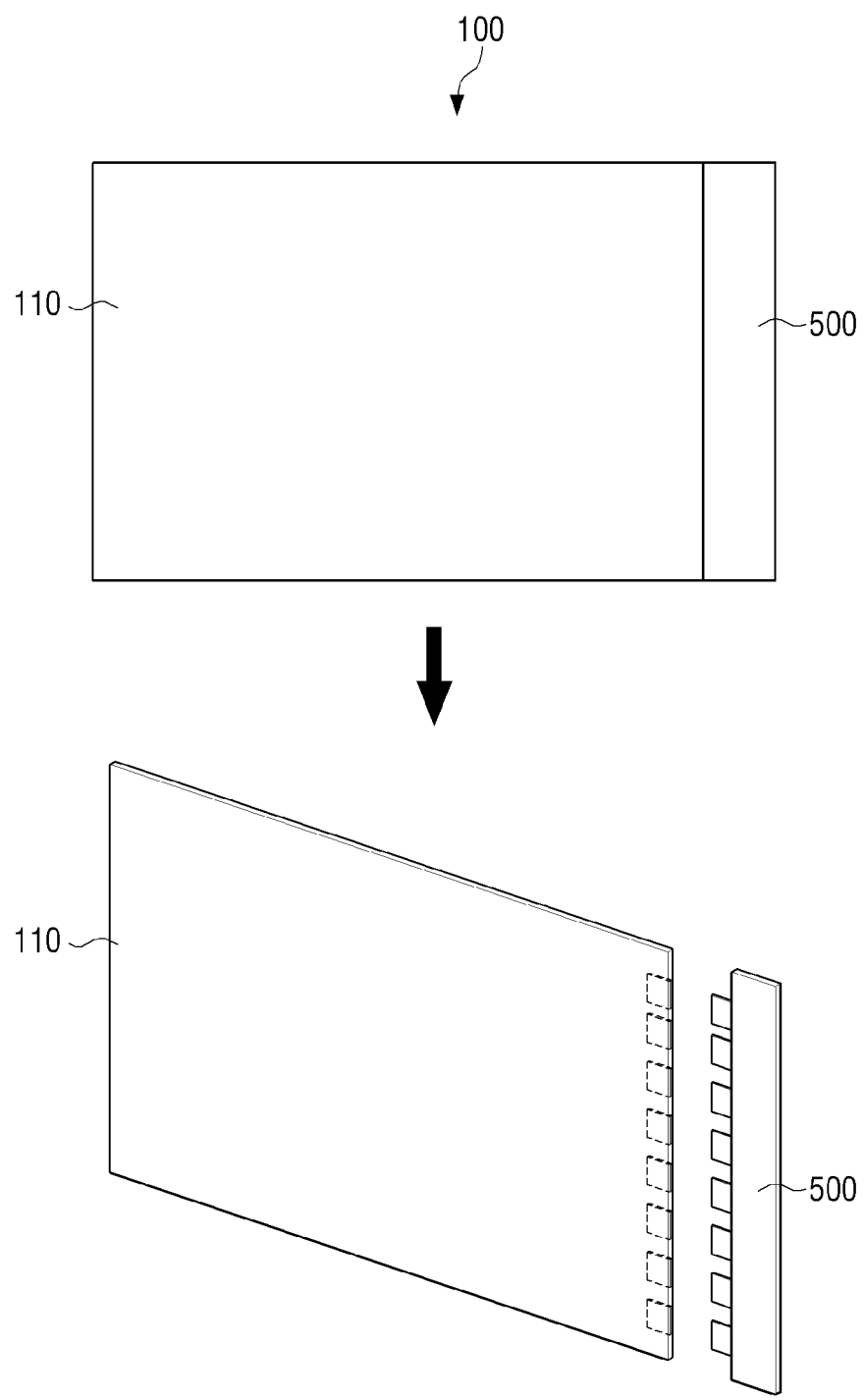
FIG. 35 is a view illustrating a flexible display apparatus where a power supply is attachable or detachable.

FIG. 35 is a view illustrating a flexible display apparatus in which a power supply 500 is attachable and detachable according to an exemplary embodiment. Referring to FIG. 35, the power supply 500 is provided on one edge of the flexible display apparatus and is attachable and detachable.

The power supply 500 is made of a flexible material and can be bent along with the display 110. Specifically, the power supply 500 includes a cathode collector, a cathode electrode, an electrolyte, an anode electrode, an anode collector, and a sheath covering the aforementioned members.

For example, the collector may be implemented by using an alloy such as TiNi having good elasticity, metal such as copper and aluminum, etc., a conductive material such as metal coated with carbon, carbon, and a carbon fiber, or a conducting polymer, etc., such as polypyrole.

The cathode electrode may be manufactured by a negative electrode material such as metal such as lithium, natrium, zinc, magnesium, cadmium, hydrogen storage alloy, and lead, etc., nonmetal such as carbon, and a high polymer electrode material such as organosulfur.

The anode electrode may be manufactured by a positive electrode material such as sulfur and metal sulfide, lithium transition metal oxide such as $LiCoO_2$, and a polymer electrode material such as $SOCl_2$, $MnO_2$, $Ag_2O$, $Cl_2$, $NiCl_2$, and NiOOH, etc. The electrolyte may be implemented in a gel form using PEO, PVdF, PMMA, and PVAC.

The sheath may use a general polymer resin. For example, PVC, HDPE, or epoxy, etc., may be used. Besides these materials, any material that can prevent damage of a thread-type cell and is freely flexible or bendable may be used for the sheath.

Each of the anode electrode and the cathode electrode in the power supply 500 may include a connector to be electrically connected to an external source.

Referring to FIG. 35, the connector protrudes from the power supply 500 and a recess corresponding to a location, a size, and a shape of the connector is formed on the display 110. Accordingly, the power supply 500 is connected with the display 110 as the connector and the recess are connected to each other. The connector of the power supply 500 is connected to a power connection pad (not shown) of the flexible display apparatus 100 to supply power to the flexible display apparatus 100.

Although the power supply 500 is attached to or detached from one edge of the flexible display apparatus 100 in FIG. 35, this is merely an example. A location and a shape of the power supply 500 may be changed according to a product characteristic. For example, when the flexible display apparatus 100 has a predetermined thickness, the power supply 500 may be mounted on a rear surface of the flexible display apparatus 100.

On the other hand, the control method of the flexible display apparatus according to the above-described various exemplary embodiments may be implemented as a program code and stored in various non-transitory computer readable media, and may be provided to each server or apparatus.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB), a memory card, and a read only memory (ROM), and may be provided.

The foregoing exemplary embodiments and advantages are merely exemplary and are not to be construed as limiting. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A flexible display apparatus comprising:
    a display configured to display an object on a screen;
    a sensor configured to sense a deformed area in the display and a shape of the deformed area; and
    a controller configured to control to reconfigure an object in the deformed area according to the shape of the deformed area and control the display to display the reconfigured object.

2. The flexible display apparatus as claimed in claim 1, wherein the sensor senses at least one of: a first area which corresponds to an area where the display is deformed into a concave shape, and a second area which corresponds to an area where the display is deformed into a convex shape,
    wherein the controller controls the display to reconfigure the displayed object in at least one of: the first area when the first area of the display is deformed into a concave shape and the second area when the second area of the display is deformed into a convex shape, and display the reconfigured object,
    wherein the first area and the second area are surrounded with areas of the display in an unchanged state.

3. The flexible display apparatus as claimed in claim 2, wherein the controller calculates height information of the sensed first area or the sensed second area.

4. The flexible display apparatus as claimed in claim 3, wherein the controller reconfigures the displayed object by scaling the displayed object on the first area or the second area, according to the calculated height information, or changes pixels of the displayed object on the first area or the second area, according to the calculated height information.

5. The flexible display apparatus as claimed in claim 3, wherein the controller reconfigures the object by displaying the displayed object on the first area and an upper menu on the displayed object on the first area, according to the calculated height information.

6. The flexible display apparatus as claimed in claim 3, wherein the controller reconfigures the object by displaying the displayed object on the second area and a lower menu on the displayed object on the second area, according to the calculated height information.

7. The flexible display apparatus as claimed in claim 3, wherein the controller reconfigures the object by displaying detailed information on the displayed object on the first area or the second area, according to the calculated height information.

8. The flexible display apparatus of claim 1, wherein the display is an electronic paper, which displays the reconfigured object using electrophoresis.

9. The flexible display apparatus of claim 1, wherein the sensor is configured to be bendable along with the display.

10. The flexible display apparatus of claim 1, wherein the sensor comprises a plurality of bend sensors formed in a pattern and cover at least a majority area of the display and wherein the display is configured to be bendable such that the majority area of the display is deformed.

11. The flexible display apparatus of claim 1, wherein:
    the sensor comprises a plurality of bend sensors forming a pattern,
    the controller further determines at least two of: a location of a bending area and a number of bending areas, a size of a bending line, a location of the bending line, a number of bending lines, a direction of the bending line, and a number of times the bending occurs, and
    said further determining by the controller is based on a relationship between the points where a change in a resistance value of the bend sensors occurs.

12. The flexible display apparatus of claim 1, wherein the controller is further configured to determine height of the deformation area of the display in a y-axis, when the display is placed on an x-axis, based on the deformation sensed by the sensor and to further control the display to reconfigure the displayed object according to the determined height of the deformed area and based on the shape formed by the deformed area, and
    wherein edges of the display remain unchanged and the bending area is a portion that does not overlap with the edges of the display.

13. A method for controlling of a flexible display apparatus which comprises a display of a shape which is deformable, the method comprising:
    displaying an object on a screen of the display;
    sensing deformation of an area in the display and a shape of the area of the deformation; and
    reconfiguring the displayed object in the sensed area of the deformation according to the deformed shape and displaying the reconfigured object in the sensed area.

14. The method as claimed in claim 13, wherein the sensing comprises sensing a first area which corresponds to an area where the display is deformed into a concave shape, or a second area which corresponds to an area where the display is deformed into a convex shape,
    wherein the reconfiguring and displaying comprises reconfiguring the displayed object on the first area or the second area and displaying the reconfigured object.

15. The method as claimed in claim 14, further comprising calculating height information of the sensed first area or the sensed second area.

16. The method as claimed in claim 15, wherein the reconfiguring and displaying comprises reconfiguring and displaying the object by scaling the displayed object on the first area or the second area, according to the calculated height information, or changing pixels of the displayed object on the first area or the second area, according to the calculated height information.

17. The method as claimed in claim 15, wherein the reconfiguring and displaying comprises reconfiguring and displaying the object by displaying the displayed object on the first area and an upper menu on the displayed object on the first area, according to the calculated height information.

18. The method as claimed in claim 15, wherein the reconfiguring and displaying comprises reconfiguring and displaying the object by displaying the displayed object on the second area and a lower menu on the displayed object on the second area, according to the calculated height information.

19. The method as claimed in claim 15, wherein the reconfiguring and displaying comprises reconfiguring and displaying the object by displaying detailed information on the displayed object on the first area or the second area, according to the calculated height information.

* * * * *